United States Patent
Nagata et al.

(10) Patent No.: US 8,520,685 B2
(45) Date of Patent: Aug. 27, 2013

(54) SIGNAL RELAY APPARATUS, NODE APPARATUS, NETWORK SYSTEM, VIRTUAL-LINK GENERATING METHOD, PATH CALCULATING METHOD, AND COMPUTER PRODUCT

(75) Inventors: Akira Nagata, Kawasaki (JP); Keiji Miyazaki, Kawasaki (JP); Shinya Kano, Kawasaki (JP); Yasuki Fujii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1222 days.

(21) Appl. No.: 11/700,095

(22) Filed: Jan. 31, 2007

(65) Prior Publication Data
US 2008/0069123 A1  Mar. 20, 2008

(30) Foreign Application Priority Data
Sep. 20, 2006  (JP) .................... 2006-254927

(51) Int. Cl.
*H04L 12/56* (2006.01)
(52) U.S. Cl.
USPC ........ 370/395.51; 370/428; 370/535; 398/49; 398/50; 398/97; 709/243; 709/244

(58) Field of Classification Search
USPC ............... 370/395.51, 534, 366, 428, 535; 709/243–244; 398/49, 50, 97
See application file for complete search history.

(56) References Cited

U.S. PATENT DOCUMENTS
| | | | |
|---|---|---|---|
| 7,031,607 B1* | 4/2006 | Aswood Smith | 398/51 |
| 2003/0174644 A1* | 9/2003 | Yagyu | 370/228 |
| 2005/0223088 A1* | 10/2005 | Gerstel | 709/223 |
| 2005/0237950 A1* | 10/2005 | Yuan et al. | 370/255 |

FOREIGN PATENT DOCUMENTS
| | | |
|---|---|---|
| JP | 2003-018200 | 1/2003 |
| JP | 2004-297230 | 10/2004 |

OTHER PUBLICATIONS
Japanese Office Action issued Mar. 1, 2011 in corresponding Japanese Patent Application 2006-254927.

* cited by examiner

*Primary Examiner* — Hoon J Chung
(74) *Attorney, Agent, or Firm* — Staas & Halsey LLP

(57) ABSTRACT

A ROADM device generates link information including a virtual link in which a first link that is used by a node apparatus for transmitting a signal and a second link of a ROADM device that is capable of branching a signal transmitted via the first link when the signal is transmitted via a WDM network are virtually connected each other, and transmits the generated link information.

20 Claims, 13 Drawing Sheets

SIGNAL RELAY APPARATUS, NODE APPARATUS, NETWORK SYSTEM, VIRTUAL-LINK GENERATING METHOD, PATH CALCULATING METHOD, AND COMPUTER PRODUCT

BACKGROUND OF THE INVENTION

1. Field of the Invention

The present invention relates to a signal relay apparatus in a network system that is configured with a signal branching apparatus that branches a signal transmitted via a first network to a second network, a signal relay apparatus that adds a signal transmitted via a third network to the first network, and a node apparatus that calculates a transmission path of a signal routed through the first network, a node apparatus, a network system, a virtual-link generating method, a path calculating method, and a computer product.

2. Description of the Related Art

Recently, in a large-scale network such as a backbone network of a telecommunications carrier and a wide area network (WAN), a communication is carried out between a transmission-side terminal and a reception-side terminal via a high-speed network such as an optical communication network. As a communication system for the optical communication network, a wavelength division multiplexing (WDM), a synchronous optical network/synchronous digital hierarchy (SONET/SDH), and the like are commonly used.

When a communication is carried out via the optical communication network, it is necessary to establish a path in advance between a transmission apparatus to which the transmission-side terminal device is connected and a transmission apparatus to which the reception-side terminal device is connected. The path is a route of a signal occupying a single wavelength in the optical communication.

A transmission apparatus connected to the optical communication network notifies link information including identification information of the transmission apparatus itself and identification information of a transmission apparatus connected to the transmission apparatus itself (hereinafter, "remote transmission apparatus") to transmission apparatuses inside and outside the network, and collects link information notified from other transmission apparatuses. Upon receiving a request for establishing a path from a terminal device connected to the transmission apparatus, the transmission apparatus establishes a path to a transmission apparatus to which a reception-side terminal device is connected, based on the collected link information.

In the notification of the link information, a routing protocol is used, and in the establishment of the path, a signaling protocol is used. For instance, in a network employing a generalized multi-protocol label switching (GMPLS), an open shortest path first-traffic engineering (OSPF-TE) is used as the routing protocol, and a resource reservation protocol-traffic engineering (RSVP-TE) is used as the signaling protocol.

However, when a signal is transmitted between the transmission apparatuses in the optical communication network, the signal may not be transmitted normally in a communication after the path has been established, due to a problem in the transmission apparatus it self, a physical factor such as loss and dispersion of the signal in an optical fiber working as a transmission line and nonlinearity of the optical fiber, and a transmission distance.

To cope with the problem, a method has been developed, in which it is verified whether a signal can be exchanged between transmission apparatuses configuring an optical communication network, a virtual link is generated between apparatuses capable of exchanging the signal, and link information of the generated virtual link is notified to apparatuses outside the network, instead of link information of a link that is actually connected with an optical fiber, to hide a connection restriction inside the optical network (see, for example, Japanese Patent Application Laid-Open No. 2003-18200).

However, when the transmission apparatus configuring the optical communication network is, in the scheme of the apparatus, a transmission apparatus having a restriction of a link with a transmission apparatus outside the network, such as a reconfigurable optical add/drop multiplexer (ROADM) (hereinafter, "a ROADM device"), a transmission apparatus located at a boundary with a transmission apparatus outside the optical communication network may not be able to branch a signal to the transmission apparatus outside the network, even when the signal is transmitted from a transmission-side transmission apparatus along a path established via the virtual link.

FIG. 12 is a schematic diagram for explaining a configuration of a conventional ROADM device. A ROADM device 1 shown in FIG. 12 multiplexes five types of signals of wavelengths λ5, λ7, λ9, λ11, and λ13, and can connect three links for transmitting the signals of wavelengths λ5, λ7, and λ9 to a node apparatus outside the optical communication network via ports L, M, and N, respectively.

In other words, the ROADM device 1 is not capable of branching the signals of wavelengths λ11 and λ13. Therefore, even when a virtual path is set for transmitting the signals of wavelengths λ11 and λ13 via other ROADM device, it is not possible to branch the signals to the node apparatus outside the optical communication network.

FIG. 13 is a schematic diagram for explaining the problem with the network having a connection restriction. An optical communication network shown in FIG. 13 is configured by connecting ROADM devices 1a to 1d via an optical fiber. Node apparatuses 2a to 2d shown in the figure are node apparatuses outside the optical communication network, which are connected to the ROADM devices 1a to 1d, respectively, so that a signal is added to and branched from the optical communication network via the ROADM devices 1a to 1d.

In the example shown in FIG. 13, the ROADM device 1a and the node apparatus 2a are connected each other via a link transmitting a signal that is transferred in the optical communication network via the wavelengths λ5 and λ9 by branching and adding the signal. The ROADM device 1b and the node apparatus 2b are connected each other via a link transmitting a signal that is transferred in the optical communication network via the wavelengths λ7 and λ9 by branching and adding the signal. The ROADM device 1d and the node apparatus 2d are connected each other via a link transmitting a signal that is transferred in the optical communication network with the wavelengths λ5 and λ7 by branching and adding the signal (An explanation will be omitted for the ROADM device 1c and the node apparatus 2c.). In addition, virtual links are generated between the ROADM devices 1a and 1d and between the ROADM devices 1b and 1d, respectively.

In this case, it is possible to set, for example, a path X for a signal transferred in the optical communication network with the wavelength λ5 between the node apparatus 2a and the node apparatus 2d. However, when it is required to set a path Y for a signal transferred in the optical communication network with the wavelength λ9 between the node apparatus 2b and the node apparatus 2d, it is not possible to set the path Y because there is no link that is capable of branching the signal between the ROADM device id and the node apparatus 2d.

Therefore, when a path to be set is through a virtual link, it is necessary to figure out whether a ROADM device of an output port of the virtual link is capable of branching a wavelength of a signal transmitted through the path before setting the path. Although it is possible to manually input information on the wavelength that can be branched by the ROADM device at the time of setting the path, it requires lots of effort of a network administrator, which is not practical.

SUMMARY OF THE INVENTION

It is an object of the present invention to at least partially solve the problems in the conventional technology.

According to an aspect of the present invention, a signal relay apparatus that is connected to a first network with a signal branching apparatus that branches a signal transmitted via the first network to a second network, the signal relay apparatus adding a signal, which is transmitted from a node apparatus via a third network, to the first network, includes a virtual-link generating unit that generates link information including a virtual link in which a first link that is used by the node apparatus for transmitting a signal and a second link of the signal branching apparatus that is capable of branching a signal transmitted via the first link when the signal is transmitted via the first network are virtually connected each other; and a link-information transmitting unit that transmits generated link information.

According to another aspect of the present invention, a node apparatus that calculates a transmission path of a signal routed through a first network that includes a signal branching apparatus and a signal relay apparatus, includes a link-information receiving unit that receives link information transmitted from a signal relay apparatus that generates the link information including a virtual link in which a first link with which a signal is transmitted from the node apparatus and a second link of the signal branching apparatus that is capable of branching a signal transmitted via the first link when the signal is transmitted via the first network are virtually connected each other; a path calculating unit that calculates the transmission path based on received link information; and a path-information transmitting unit that transmits calculated transmission path as path information.

According to still another aspect of the present invention, a network system configured with a signal branching apparatus that branches a signal transmitted via a first network to a second network, a signal relay apparatus that adds a signal transmitted via a third network to the first network, and a node apparatus that calculates a transmission path of a signal routed through the first network, wherein the signal relay apparatus is connected to the first network with the signal branching apparatus. The signal relay apparatus includes a virtual-link generating unit that generates link information including a virtual link in which a first link that is used by the node apparatus for transmitting a signal and a second link of the signal branching apparatus that is capable of branching a signal transmitted via the first link when the signal is transmitted via the first network are virtually connected each other; and a link-information transmitting unit that transmits generated link information. The node apparatus includes a link-information receiving unit that receives link information transmitted from the signal relay apparatus a path calculating unit that calculates the transmission path based on received link information; and a path-information transmitting unit that transmits calculated transmission path as path information.

According to still another aspect of the present invention, a virtual-link generating method of generating a virtual link by a signal relay apparatus that is connected to a first network with a signal branching apparatus that branches a signal transmitted via the first network to a second network, the signal relay apparatus adding a signal, which is transmitted from a node apparatus via a third network, to the first network, includes generating link information including a virtual link in which a first link that is used by the node apparatus for transmitting a signal and a second link of the signal branching apparatus that is capable of branching a signal transmitted via the first link when the signal is transmitted via the first network are virtually connected each other; and transmitting link information generated at the generating.

According to still another aspect of the present invention, a path calculating method of calculating a transmission path of a signal routed through a first network that is built by a signal branching apparatus and a signal relay apparatus, includes receiving link information transmitted from a signal relay apparatus that generates the link information including a virtual link in which a first link with which a signal is transmitted from the node apparatus and a second link of the signal branching apparatus that is capable of branching a signal transmitted via the first link when the signal is transmitted via the first network are virtually connected each other; calculating the transmission path based on the link information received at the receiving; and transmitting the transmission path calculated at the calculating as path information.

According to still another aspects of the present invention, a computer-readable recording medium stores therein a computer program that causes a computer to implement the above methods.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments according to the present invention are explained in detail below with reference to the accompanying drawings. Explanation will be focused on a case in which the present invention is applied to a ROADM device that adds and branches a signal with respect to a WDM network.

Figure 1:
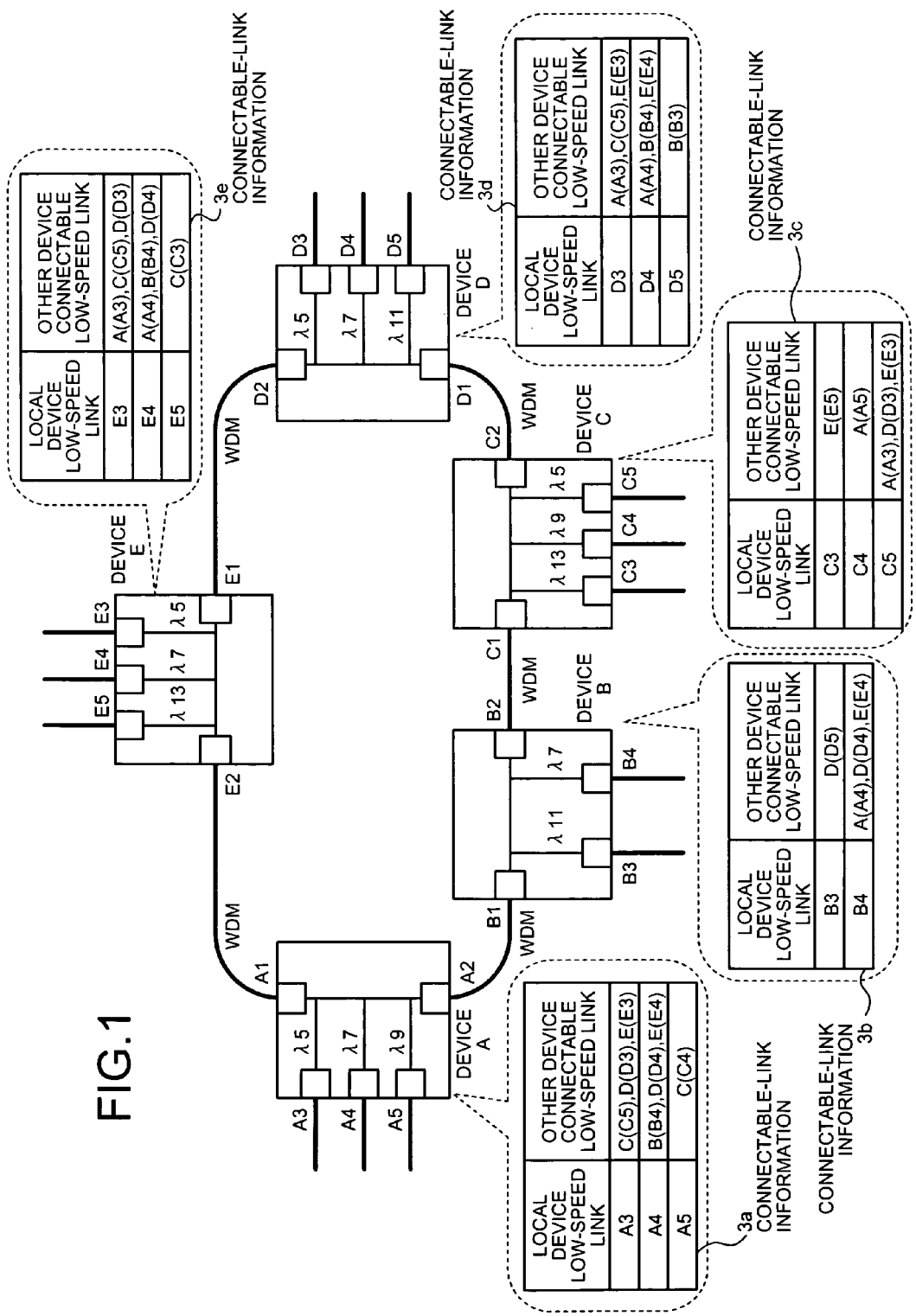
FIGS. 1 to 3 are schematic diagrams for explaining a method of generating a virtual link according to an embodiment of the present invention.
Figure 2:
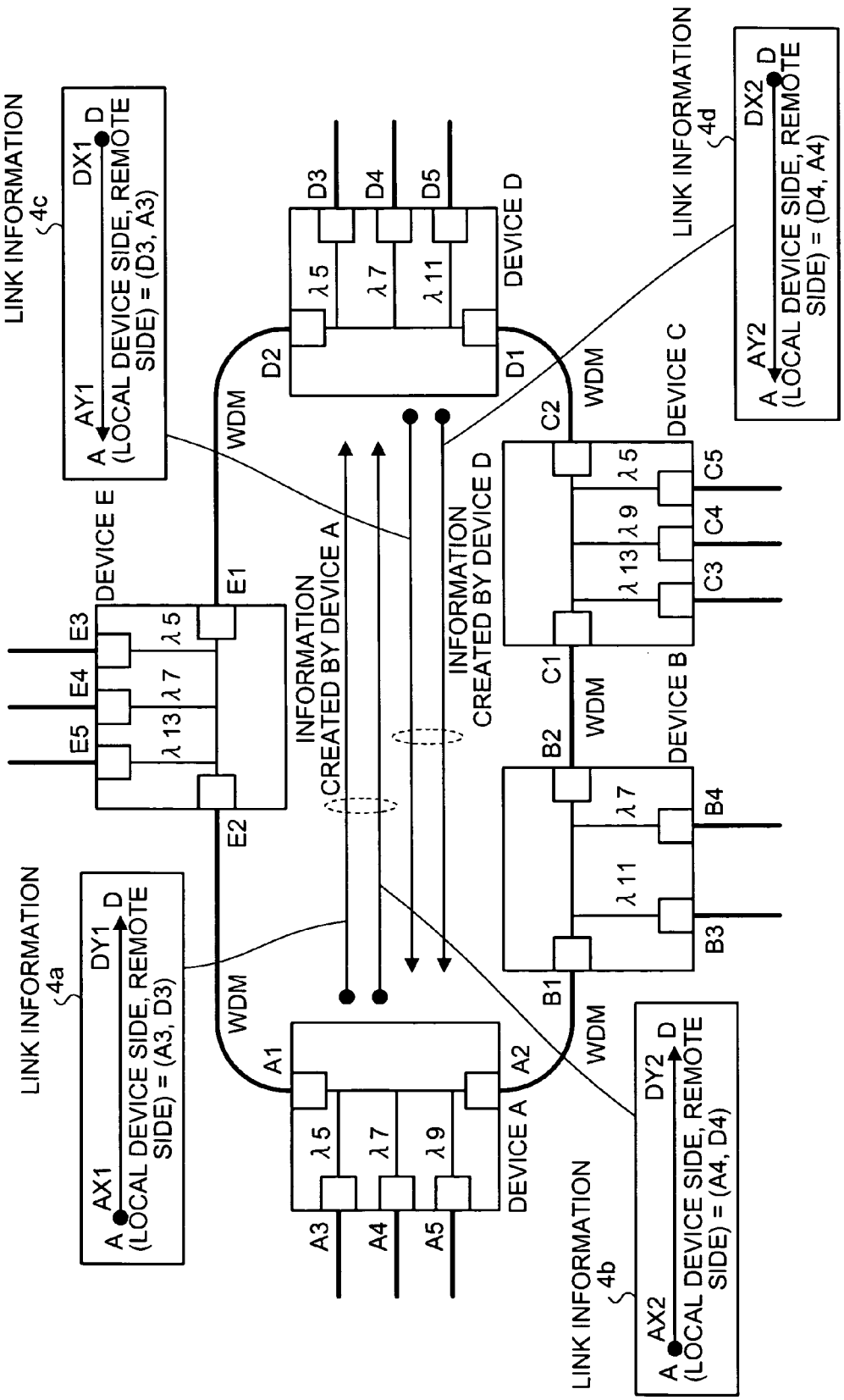
Figure 3:
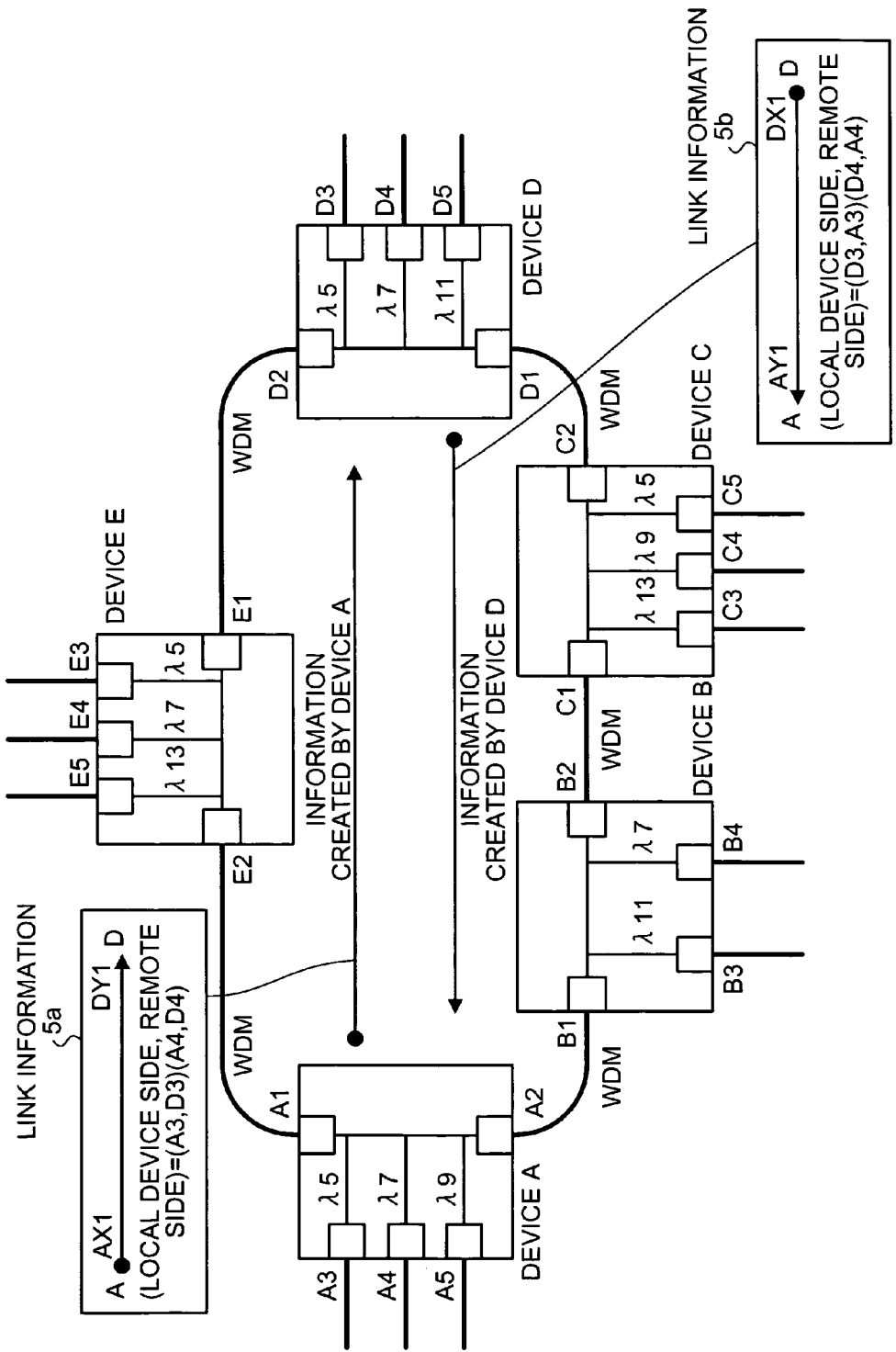

FIGS. 1 to 3 are schematic diagrams for explaining a method of generating a virtual link according to an embodiment of the present invention. The networks shown in those figures are ling-type networks multiplexed in a WDM system. In each of the WDM networks, devices A to E are connected. Each of the devices A to E is a ROADM device that adds and branches an optical signal with respect to the WDM networks.

Each of the devices A to E is connected to a network having a low transmission speed (hereinafter, "a low-speed network"), such as an Internet-protocol (IP) network and a local area network (LAN), and is capable of adding a signal transmitted from the low-speed network to the WDM network as an optical signal having a predetermined wavelength and branching an optical signal having a predetermined wavelength transmitted from the WDM network to the low-speed network.

The device A is connected to the low-speed network via low-speed links A3, A4, and A5. The device A is capable of adding signals, which are transmitted from the low-speed links A3, A4, and A5, to the WDM network as optical signals of wavelengths $\lambda 5$, $\lambda 7$, and $\lambda 9$, respectively. Moreover, the device A is capable of branching optical signals of wavelengths $\lambda 5$, $\lambda 7$, and $\lambda 9$ transmitted from the WDM network via WDM links A1 and A2 to the low-speed network via the low-speed links A3, A4, and A5, respectively.

The device B is connected to the low-speed network via low-speed links B3 and B4. The device B is capable of adding signals, which are transmitted from the low-speed links B3 and B4, to the WDM network as optical signals of wavelengths $\lambda 11$ and $\lambda 7$, respectively. Moreover, the device B is capable of branching optical signals of wavelengths $\lambda 11$ and $\lambda 7$ transmitted from the WDM network via WDM links B1 and B2 to the low-speed network via the low-speed links B3 and B4, respectively.

The device C is connected to with the low-speed network via low-speed links C3, C4, and C5. The device C is capable of adding signals, which are transmitted from the low-speed links C3, C4, and C5, to the WDM network as optical signals of wavelengths $\lambda 13$, $\lambda 9$, and $\lambda 5$, respectively. Moreover, the device C is capable of branching optical signals of wavelengths $\lambda 13$, $\lambda 9$, and $\lambda 5$ transmitted from the WDM network via WDM links C1 and C2 to the low-speed network via the low-speed links C3, C4, and C5, respectively.

The device D is connected to the low-speed network via low-speed links D3, D4, and D5. The device D is capable of adding signals, which are transmitted from the low-speed links D3, D4, and D5, to the WDM network as optical signals of wavelengths $\lambda 5$, $\lambda 7$, and $\lambda 11$, respectively. Moreover, the device D is capable of branching optical signals of wavelengths $\lambda 5$, $\lambda 7$, and $\lambda 11$ transmitted from the WDM network via WDM links D1 and D2 to the low-speed network via the low-speed links D3, D4, and D5, respectively.

The device E is connected to the low-speed network via low-speed links E3, E4, and E5. The device E is capable of adding signals, which are transmitted from the low-speed links E3, E4, and E5, to the WDM network as optical signals of wavelengths $\lambda 5$, $\lambda 7$, and $\lambda 13$, respectively. The device E is capable of branching optical signals of wavelengths $\lambda 5$, $\lambda 7$, and $\lambda 13$ transmitted from the WDM network via WDM links E1 and E2 to the low-speed network via the low-speed links E3, E4, and E5, respectively.

Each of the devices A to E stores therein connectable-link information, for each link of the low-speed network connected to a local device (hereinafter, "a low-speed link"), in which the low-speed link of the local device is associated with a low-speed link of other device that is capable of branching a signal transmitted via the low-speed link of the local device. The low-speed link that is capable of branching a signal means a low-speed link, when an establishment of an optical path for adding and branching a signal via the low-speed link is tried, with which wavelengths of optical signals of an adding destination and a branching source on the WDM network side are the same.

As shown in FIG. 1, the device A, the device B, the device C, the device D, and the device E store therein connectable-link information 3a, connectable-link information 3b, connectable-link information 3c, connectable-link information 3d, and connectable-link information 3e, respectively.

For instance, in the connectable-link information 3a stored in the device A, the low-speed links A3 is associated with the low-speed links C5 of the device C, the low-speed links D3 of the device D, and the low-speed links E3 of the device E, the low-speed links A4 is associated with the low-speed links B5 of the device B, the low-speed links D4 of the device D, and the low-speed links E4 of the device E, and the low-speed links A5 is associated with the low-speed links C4 of the device C.

The virtual-link generating method according to the present embodiment assumes that the connectable-link information is stored in advance in each of the devices connected to the WDM network. No particular mention will be made about methods of generating and storing the connectable-link information. For instance, a network administrator can input necessary information to each of the devices to generate and store the connectable-link information, or a network managing apparatus (not shown) can collect information on the low-speed link from each of the devices to generate the connectable-link information so that each of the devices acquires and stores generated connectable-link information.

With the above assumption, each of the devices connected to the WDM network generates a virtual link with other devices based on the stored connectable-link information. After that, each of the devices notifies link information indicating the generated virtual link to other devices connected to the WDM network and the low-speed network.

In the link information notified in the above manner includes an identifier for identifying a local device (hereinafter, "a local device identifier"), an identifier for identifying a low-speed link of the local device (hereinafter, "a local-device-side link identifier"), an identifier for identifying a remote device (hereinafter, "a remote device identifier"), an identifier for identifying a low-speed link of the remote device that is capable of branching the low-speed link of the local device (hereinafter, "a remote-device-side link identifier", and a pair of connectable links (hereinafter, "a connectable link pair").

A virtual link generated between the device A and the device D is considered with reference to FIG. 2. The device A generates two virtual links based on the connectable-link information 3a: one indicating that a path can be established from the low-speed link A3 of the device A to the low-speed link D3 of the device D; and the other indicating that a path can be established from the low-speed link A4 of the device A to the low-speed link D4 of the device D. The former virtual link is indicated by link information 4a and the latter virtual link is indicated by link information 4b, as shown in the figure.

The link information 4a indicates a virtual link with the local device identifier "A", the local-device-side link identifier "AX1", the remote device identifier "D", the remote-device-side link identifier "DY1", and the connectable link pair "A3 and D3", and the link information 4b indicates a virtual link with the local device identifier "A", the local-device-side link identifier "AX2", the remote device identifier "D", the remote-device-side link identifier "DY2", and the connectable link pair "A4 and D4". Each of "AX1", "AX2", "DY1", and "DY2" is an identifier indicating a virtual link.

On the other hand, the device D generates two virtual links based on the connectable-link information 3d: one indicating that a path can be established from the low-speed link D3 of the device D to the low-speed link A3 of the device A; and the other indicating that a path can be established from the low-speed link D4 of the device D to the low-speed link A4 of the device A. The former virtual link is indicated by link information 4c and the latter virtual link is indicated by link information 4d, as shown in the figure.

The link information 4c indicates a virtual link with the local device identifier "D", the local-device-side link identifier "DX1", the remote device identifier "A", the remote-device-side link identifier "AY1", and the connectable link pair "D3 and A3", and the link information 4d indicates a virtual link with the local device identifier "D", the local-device-side link identifier "DX2", the remote device identifier "A", the remote-device-side link identifier "AY2", and the connectable link pair "D4 and A4". Each of "AY1", "AY2", "DX1", and "DX2" is an identifier indicating a virtual link.

Although the virtual link is generated for each pair of the low-speed links in the example shown in FIG. 2, the virtual link can be generated for each pair of the devices. FIG. 3 shows a case in which the virtual link is generated for each pair of the devices. In this case, the device A generates a single virtual link from the device A to the device D. The generated virtual link is indicated by link information 5a, as shown in the figure. With this scheme, it is possible to reduce the number of pieces of link information to be generated.

The link information 5a indicates a virtual link with the local device identifier "A", the local-device-side link identifier "AX1", the remote device identifier "D", the remote-device-side link identifier "DY1", and the connectable link pair "A3 and D3" and "A4 and D4" Each of "AX1" and "DY1" is an identifier indicating a virtual link.

On the other hand, the device D generates a single virtual link from the device D to the device A. The generated virtual link is indicated by link information 5b, as shown in the figure.

The link information 5b indicates a virtual link with the local device identifier "D", the local-device-side link identifier "DX11", the remote device identifier "A", the remote-device-side link identifier "AY1", and the connectable link pair "D3 and A3" and "D4 and A4" Each of "AY1" and "DX1" is an identifier indicating a virtual link.

In other words, each of the devices generates the virtual link by including a plurality of connectable link pairs in the link information.

All of the devices connected to the WDM network perform a generation of the virtual link described above. Each of the devices that generated the virtual link notifies link information indicating the generated virtual link to the WDM network and the low-speed network that is connected to the device itself. With this scheme, link information of all links including the link information on the virtual link is shared by all devices connected to the WDM network and the low-speed network.

As described above, according to the present embodiment, the virtual link is generated not only considering if a signal is reachable to a remote device but also considering if the remote device is capable of branching the signal.

Figure 4:
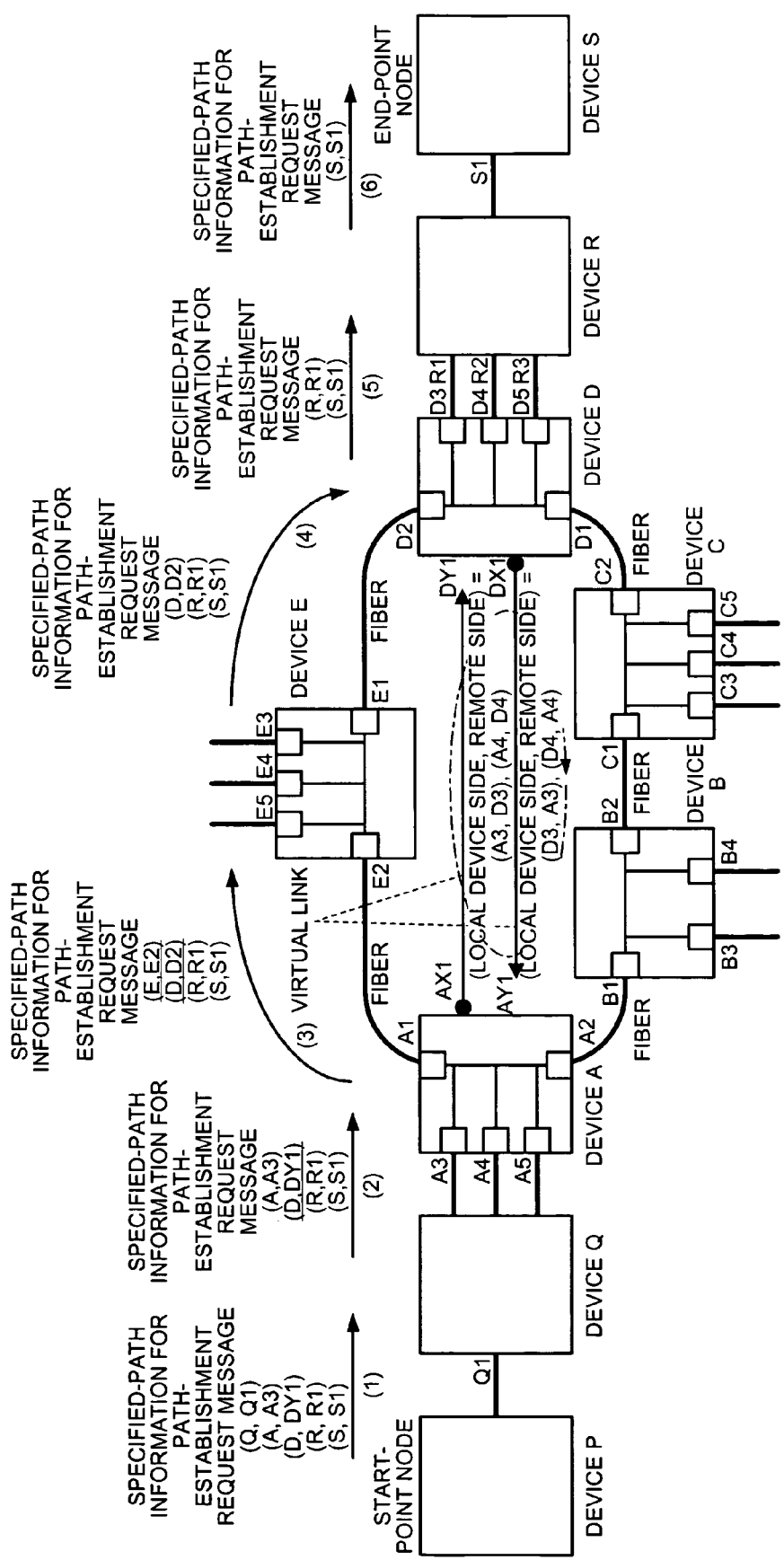
FIGS. 4 and 5 are schematic diagrams for explaining a method of setting a path according to the embodiment.
Figure 5:
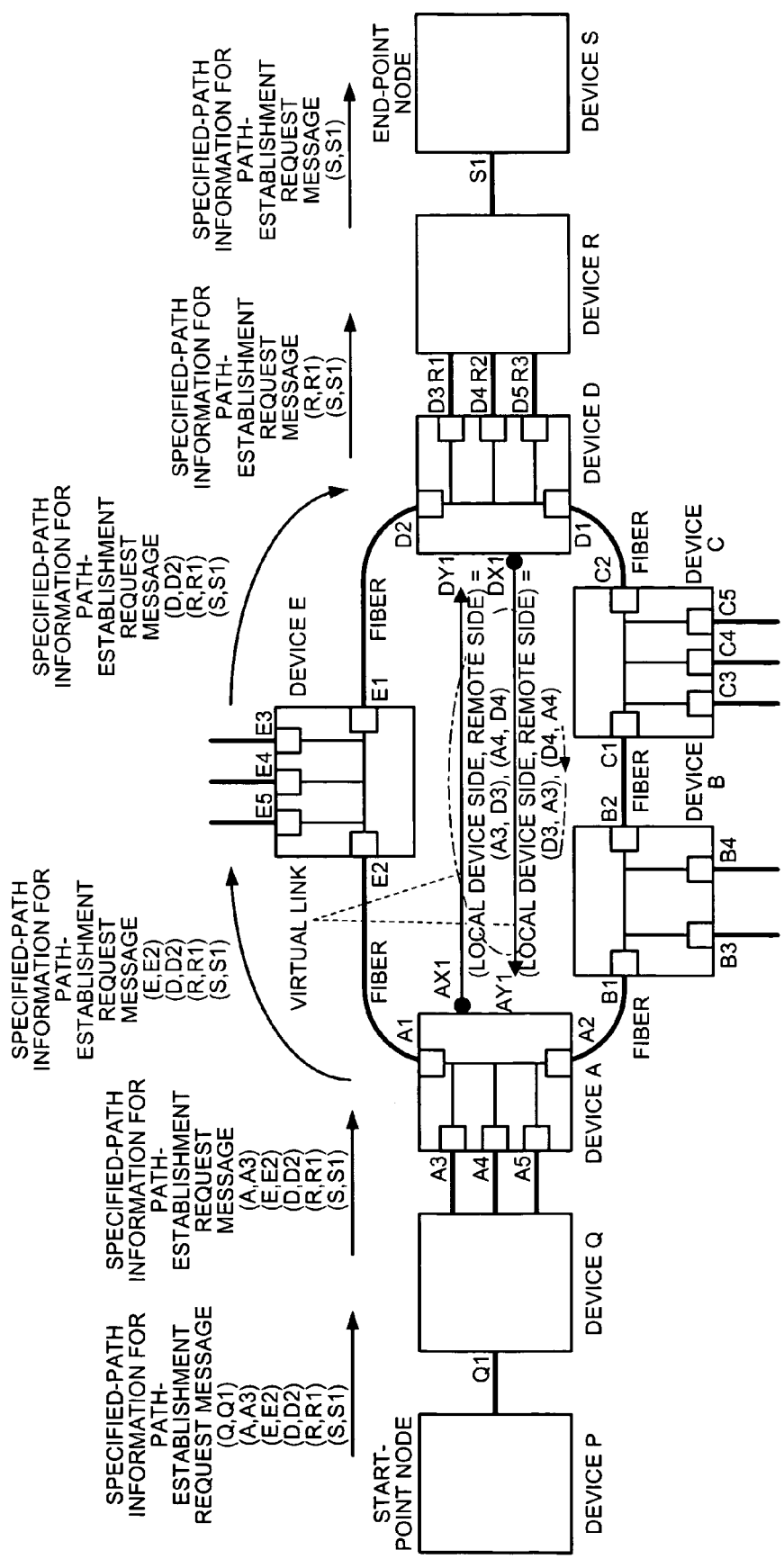

FIGS. 4 and 5 are schematic diagrams for explaining a method of setting a path after generating the virtual link. The ring-type networks shown in the figures are the WDM networks shown in FIGS. 1 to 3, and it is assumed that a generation of all virtual links and a notification of the link information are performed.

A device Q is connected to a device A via low-speed links A3, A4, and A5, and a device P is connected to the device Q via a link Q1. A device R is connected to a device D via low-speed links D3, D4, and D5, and a device S is connected to the device R via a link S1, where the low-speed links D3, D4, and D5 are the same links as links R1, R2, and R3 of the device R, respectively. Each of devices P to S shown in the figure is a node apparatus that becomes a connecting point or a relay point of a network such as the IP network and the LAN.

A case in which a path is set from the device P to the device S is considered with reference to FIG. 4. It is assumed that the device P received a request for establishing the path from the device P to the device S from a terminal user via a terminal apparatus (not shown) connected to the device P. In response to the request, the device P performs a path calculation for the requested path by referring to the stored link information. In the link information referred by the device P, link information indicating a virtual link generated by a device connected to the WDM network is included.

After performing the path calculation, the device P transmits a path-establishment request message to the device Q based on a result of the path calculation (see (1) in FIG. 4). The path-establishment request message includes an identifier of the link Q1 of the device Q, an identifier of the low-speed link A3 of the device A, an identifier of the virtual link DY1 of the device D, an identifier of the link R1 of the device R, and an identifier of the link S1 of the device S, as specified-path information indicating an order of transmitting the message. The virtual link DY1 of the device D is an identifier indicating a virtual link.

Upon receiving the path-establishment request message from the device P, the device Q performs a path setting to the link Q1 that is specified in the specified-path information, and transmits the path-establishment request message from which the link Q1 is deleted to the device A that is the next transmission destination (see (2) in FIG. 4).

Upon receiving the path-establishment request message from the device Q, the device A performs a path setting to the low-speed link A3 that is specified in the specified-path information. After confirming that the virtual link DY1 of the device D that is specified as the next transmission destination is an identifier indicating a virtual link, the device A deletes the identifier of the virtual link DY1 from the path-establishment request message, and instead, inserts an identifier of a link that is actually connected by a fiber (hereinafter, "an actual link"), i.e., an identifier of a WDM link E2 of a device E and an identifier of a WDM link D2 of the device D, in the path-establishment request message. Then, the device A transmits the path-establishment request message to the device E that is the next transmission destination (see (3) in FIG. 4).

Upon receiving the path-establishment request message from the device A, the device E performs a path setting to the WDM link E2 that is specified in the specified-path information, and transmits the path-establishment request message from which the WDM link E2 is deleted to the device D that is the next transmission destination (see (4) in FIG. 4).

In the same way, the path-establishment request message is transmitted to the device S through the device D and the device R, and as a result, the path from the device P to the device S is established (see (5) and (6) in FIG. 4).

In this manner, when a device connected to the WDM network receives a path-establishment request message including an identifier of a virtual link, a path routed through the virtual link can be established by replacing the identifier of the virtual link with an identifier of an actual link.

Although a case in which the device connected to the WDM network replaces the identifier of the virtual link with the identifier of the actual link is explained in the example shown in FIG. 4, a device at a start point of the path establishment can replace the identifier of the virtual link with the identifier of the actual link in advance. In this case, the device connected to the WDM network notifies, when notifying the link information on the virtual link, an identifier of an actual link corresponding to the virtual link together with the identifier of the virtual link.

FIG. 5 shows a case in which the device at the start point of the path establishment replaces the identifier of the virtual link with the identifier of the actual link in advance. In the example shown in FIG. 5, the identifier of the virtual link DY1 is replaced with an identifier of an actual link, i.e., the WDM link E2 of the device E and the WDM link D2 of the device D, in the path-establishment request message transmitted from the device P.

Figure 6:
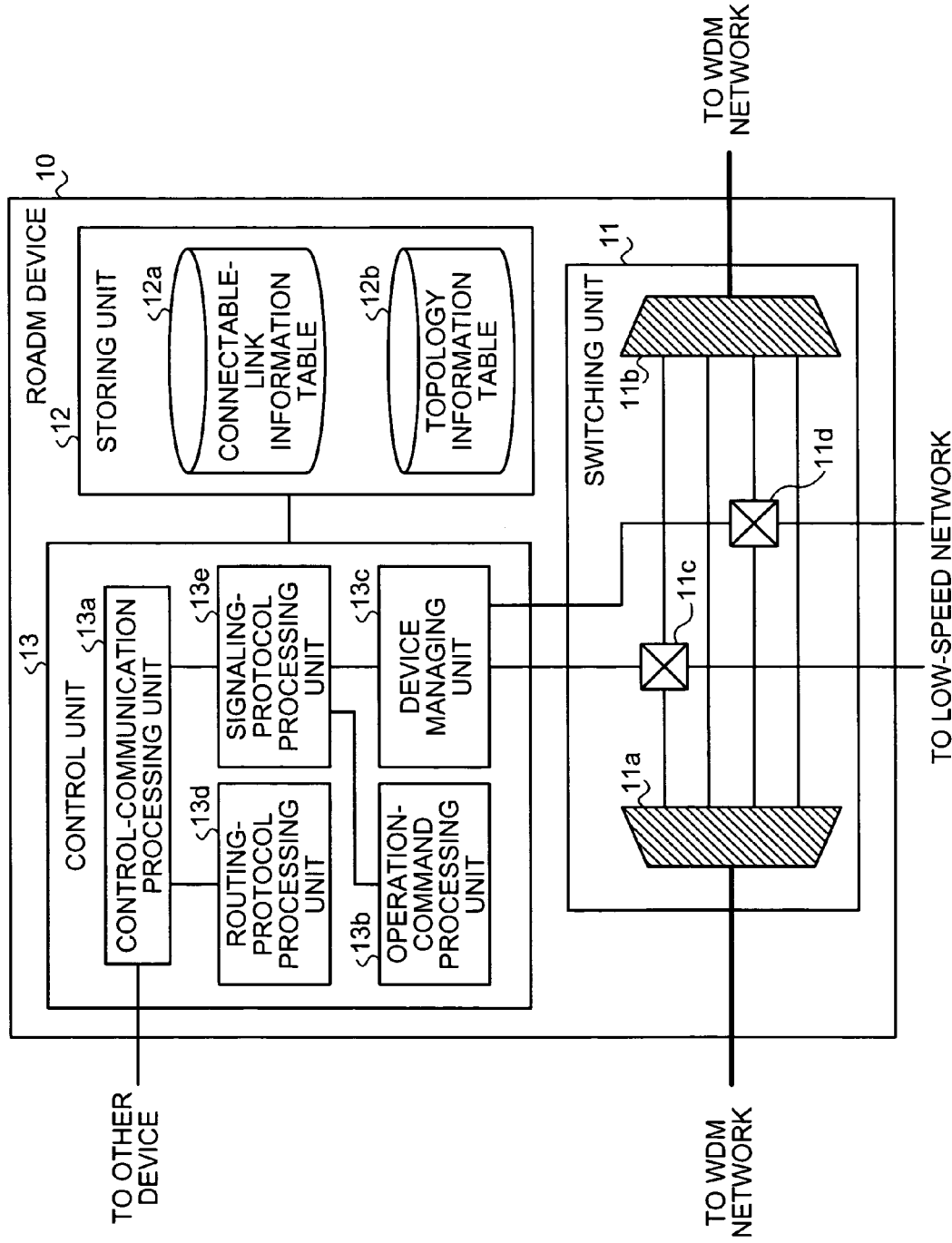
FIG. 6 is a functional block diagram of an ROADM device according to the embodiment.

Following is an explanation of a configuration of the ROADM device according to the embodiment. The ROADM device explained below is the one corresponding to the devices A to E shown in FIGS. 1 to 5. FIG. 6 is a functional block diagram of a ROADM device 10 according to the embodiment. As shown in the figure, the ROADM device 10 includes a switching unit 11, a storing unit 12, and a control unit 13. Although the ROADM device 10 also includes other function units that are included in a common ROADM device, such function units are not shown in the figure for the sake of explanation.

The switching unit 11 includes a splitter 11a and a combiner 11b, and optical switches 11c and 11d, and switches between an adding of a signal and a branching of a signal transmitted from the low-speed network to an optical signal transmitted from the WDM network.

The storing unit 12 stores various pieces of information, including a connectable-link information table 12a and a topology information table 12b. The connectable-link information table 12a stores the connectable-link information shown in FIG. 1. In the connectable-link information, a low-speed link of a local device is associated with a low-speed link of other device that is capable of branching a signal transmitted via the low-speed link of the local device, for each low-speed link connected to the local device.

The topology information table 12b stores the link information shown in FIGS. 2 and 3. The topology information table 12b stores not only the link information of the local device but also all link information notified from the other devices, and the link information stored in the topology information table 12b also includes link information indicating a virtual link. Each piece of link information includes a local device identifier, a local-device-side link identifier, a remote device identifier, a remote-device-side link identifier, and a connectable link pair, as well as property information such as information on a cost and information on a bandwidth. In addition, when a device that is a start point of a path establishment replaces an identifier of a virtual link with an identifier of an actual link, the link information further includes an identifier of the actual link corresponding to the virtual link.

The control unit 13 performs an overall control of the ROADM device 10, including a control-communication processing unit 13a, an operation-command processing unit 13b, a device managing unit 13c, a routing-protocol processing unit 13d, and a signaling-protocol processing unit 13e.

The control-communication processing unit 13a controls transmission and reception of various control messages exchanged between the local device and the other device. For instance, the control-communication processing unit 13a distributes a control message received from the other device to the routing-protocol processing unit 13d and the signaling-protocol processing unit 13e, and transmits link information generated by the routing-protocol processing unit 13d and a path-establishment request message edited by the signaling-protocol processing unit 13e.

The control-communication processing unit 13a can be configured to receive the control message by using, for example, a single specific wavelength from among a plurality of wavelength multiplexed in the WDM network, instead of using a dedicated control line.

The operation-command processing unit 13b transfers path-setting information input from a network managing apparatus by a network administrator to the signaling-protocol processing unit 13e.

The device managing unit 13c controls the optical switches 11c and 11d based on the path setting set by the signaling-protocol processing unit 13e, and performs an adding a signal and a branching a signal with respect to the WDM network.

The routing-protocol processing unit 13d performs processes regarding a generation of a virtual link and a notification and a storing of the link information. The routing-protocol processing unit 13d generates a virtual link between the low-speed link of the ROADM device 10 and the low-speed link of the other ROADM device based on the connectable link information stored in the connectable-link information table 12a. A processing procedure for a virtual-link generating process will be explained later in detail with reference to FIG. 8.

In addition, the routing-protocol processing unit 13d also generates link information between the low-speed link of the ROADM device 10 and a node apparatus connected via a low-speed network as usual, as well as the virtual link generated between the low-speed link of the ROADM device 10 and the low-speed link of the other ROADM device Furthermore, the routing-protocol processing unit 13d regenerates the virtual link every time the connectable-link information stored in the connectable-link information table 12a or a state of the low-speed link is changed, and notifies the regenerated virtual link. With this scheme, it is possible to maintain the latest state of the virtual link.

The routing-protocol processing unit 13d notifies link information indicating the generated virtual link to the other devices, and upon receiving link information notified from other ROADM device or other node apparatus from the control-communication processing unit 13a, stores the received link information in the topology information table 12b.

For the notification of the link information performed by the routing-protocol processing unit 13d, a predetermined routing protocol is used. For example, the OSPF-TE is used in a network employing the GMPLS.

In addition, when notifying link information of an actual link connected within the WDM network as well as the virtual link, the routing-protocol processing unit 13d adds property information to the link information so that the virtual link can be differentiated from the actual link. For the property information, for example, if the network employs the GMPLS, an information field called a "resource color sub-TLV" of the OSPF-TE can be used. For instance, when "Resource Color=RED" is added to the information field, the link information is defined as the actual link.

With this scheme, it is possible to clearly specify the link information of the actual link as different from the link information on the virtual link with respect to the node apparatus outside the WDM network, and even when notifying the link information of the actual link together with the link information on the virtual link, the link information of the actual link can be deleted when a path calculation is performed in a node apparatus.

The signaling-protocol processing unit 13e performs a path setting for a path that passes the link of the ROADM device 10, based on the specified-path information included in the path-establishment request message received via the control-communication processing unit 13a and the path-setting information input via the operation-command processing unit 13b.

In addition, the signaling-protocol processing unit 13e performs a path setting for a path, based on a path-establishment request message. Upon receiving the path-establishment request message via the control-communication processing unit 13a, the signaling-protocol processing unit 13e performs a path setting of a path that passes the link of the ROADM device 10, based on the specified-path information included in the path-establishment request message, and transmits the path-establishment request message to a device that is specified as the next transmission destination after deleting the set link information from the specified-path information. At this moment, when it is confirmed that a link of the device that is specified as the next transmission destination is a virtual link, the signaling-protocol processing unit 13e deletes an identifier of the virtual link form the path-establishment request message, and instead, inserts an identifier of the actual link in the path-establishment request message.

When inserting the identifier of the actual link in the path-establishment request message, the signaling-protocol processing unit 13e selects a combination of the actual links that minimizes a hop count, a combination of the actual links that minimizes a cost, or a combination of the actual links depending on a free state of a bandwidth of the actual link, and inserts the selected actual link in the path-establishment request message. With this scheme, it is possible to efficiently allocate the actual link considering the resources of the actual link.

For the transmission of the path-establishment request message by the signaling-protocol processing unit 13e, a predetermined signaling protocol is used. For example, the RSVP-TE is used in a network employing the GMPLS.

Figure 7:
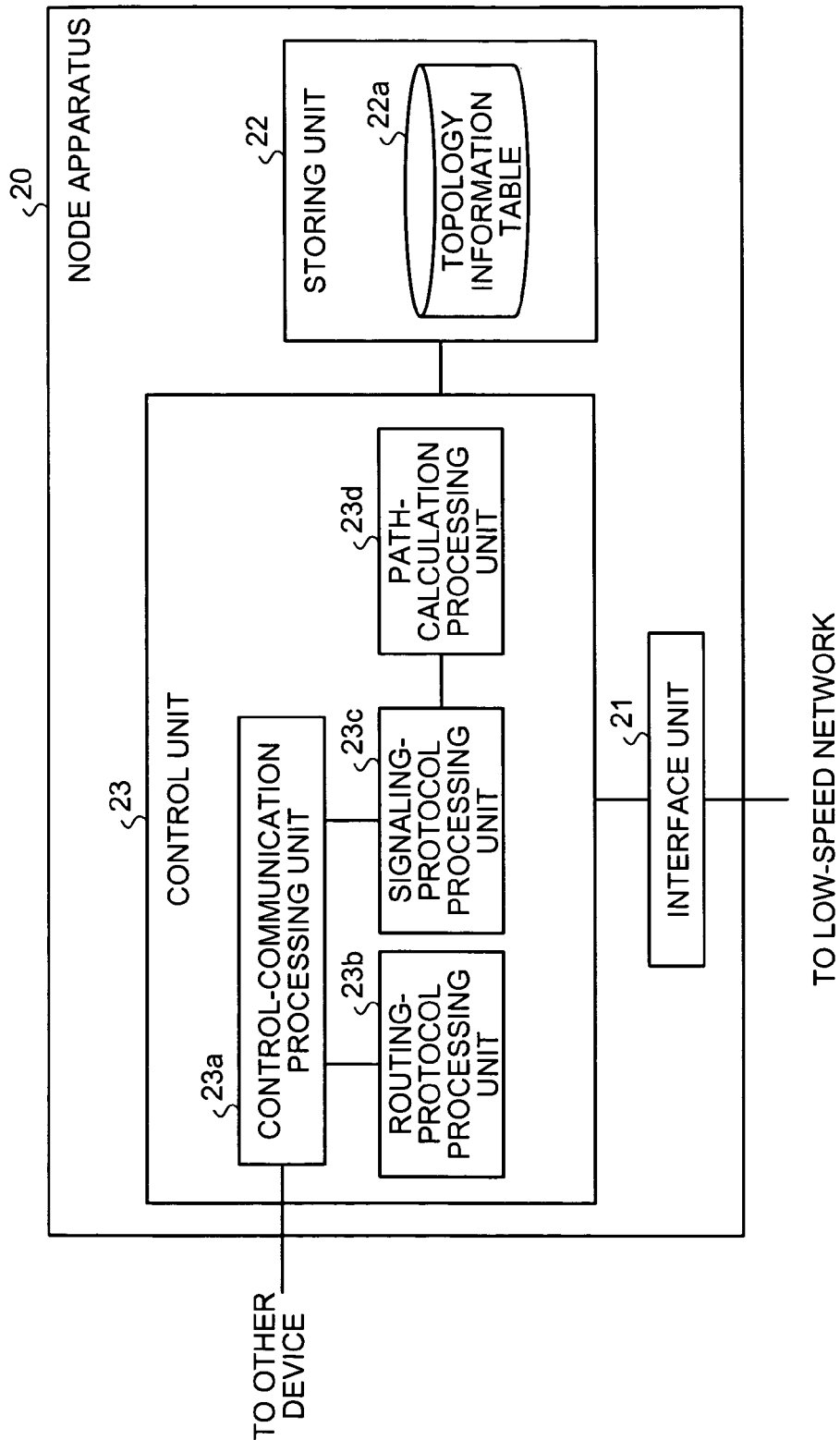
FIG. 7 is a functional block diagram of a node apparatus according to the embodiment.

Following is an explanation of a configuration of the node apparatus according to the embodiment. The node apparatus explained below is the one corresponding to the devices P to S shown in FIGS. 4 and 5. FIG. 7 is a functional block diagram of a node apparatus 20 according to the embodiment. As shown in the figure, the node apparatus 20 includes an interface unit 21, a storing unit 22, and a control unit 23. Although the node apparatus 20 also includes other function units that are included in a common transmission apparatus or a common relay apparatus, such function units are not shown in the figure for the sake of explanation.

The interface unit 21 performs an interface control for exchanging various types of data via the low-speed network.

The storing unit 22 stores various pieces of information, including a topology information table 22a. The topology information table 22a stores the link information shown in FIGS. 2 and 3. The topology information table 22a stores not only the link information of the local device but also all link information notified from the other devices, and the link information stored in the topology information table 22a also includes link information indicating a virtual link. Each piece of link information includes a local device identifier, a local-device-side link identifier, a remote device identifier, a remote-device-side link identifier, and a connectable link pair, as well as property information such as information on a cost and information on a bandwidth. In addition, when a device that is a start point of a path establishment replaces an identifier of a virtual link with an identifier of an actual link, the link information further includes an identifier of the actual link corresponding to the virtual link.

The control unit 23 performs an overall control of the node apparatus 20, including a control-communication processing unit 23a, a routing-protocol processing unit 23b, a signaling-protocol processing unit 23c, and a path-calculation processing unit 23d.

The control-communication processing unit 23a controls transmission and reception of various control messages exchanged between the local device and the other device. For instance, the control-communication processing unit 23a distributes a control message received from the other device to the routing-protocol processing unit 23b, the signaling-protocol processing unit 23c, and the path-calculation processing unit 23d, and transmits link information generated by the routing-protocol processing unit 23b and a path-establishment request message edited by the signaling-protocol processing unit 23c.

The routing-protocol processing unit 23b performs processes regarding a notification and a storing of the link information. The routing-protocol processing unit 13d generates the link information with other devices connected to the node apparatus 20, and notifies the generated link information to the other devices. Upon receiving link information notified from other ROADM device or other devices from the control-communication processing unit 23a, the routing-protocol processing unit 23b stores the received link information in the topology information table 22a.

For the notification of the link information performed by the routing-protocol processing unit 23b, a predetermined routing protocol is used. For example, the OSPF-TE is used in a network employing the GMPLS.

The signaling-protocol processing unit 23c performs a path setting for a path, based on a path-establishment request message. Upon receiving the path-establishment request message via the control-communication processing unit 23a, the signaling-protocol processing unit 23c performs a path setting of a path that passes the link of the node apparatus 20, based on the specified-path information included in the path-establishment request message, and transmits the path-establishment request message to a device that is specified as the next transmission destination after deleting the set link information from the specified-path information.

When the link information of the actual link is also notified together with the link information on the virtual link, the signaling-protocol processing unit 23c can transmit the path-establishment request message after replacing the virtual link with the actual link if the apparatus itself is a node that becomes a start point of a signal transmission.

Furthermore, upon receiving specified-path information from the path-calculation processing unit 23d, the signaling-protocol processing unit 23c generates the path-establishment request message including the specified-path information, and transmits the generated path-establishment request message to the device that is specified as the transmission destination.

For the transmission of the path-establishment request message by the signaling-protocol processing unit 23c, a predetermined signaling protocol is used. For example, the RSVP-TE is used in a network employing the GMPLS.

The path-calculation processing unit 23d performs a path calculation for a path based on the link information. Upon receiving a request for establishing a path from a terminal user via a terminal apparatus connected to the node apparatus 20, the path-calculation processing unit 23d performs a path calculation for the requested path based on the link information stored in the topology information table 22a, generates the specified-path information based on a result of the path calculation, and transfers the generated specified-path information to the signaling-protocol processing unit 23c. A processing procedure for a path calculating process will be explained later in detail with reference to FIG. 9.

Figure 8:
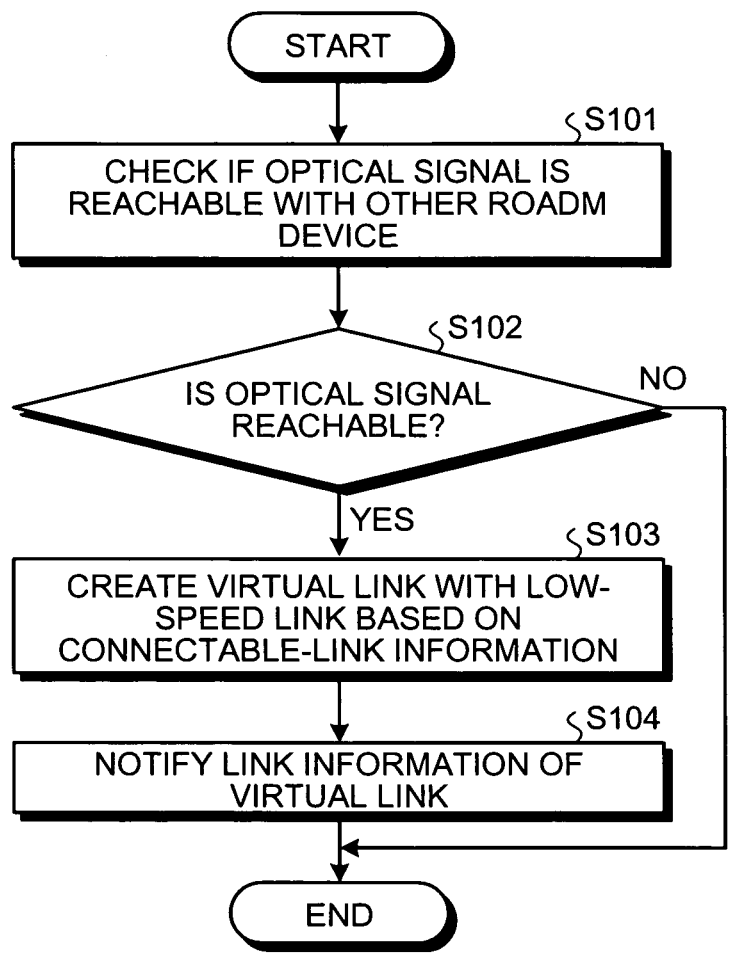
FIG. 8 is a flowchart of a virtual-link generating process performed by the ROADM device shown in FIG. 6.

FIG. 8 is a flowchart of the virtual-link generating process performed by the ROADM device 10 according to the embodiment.

As shown in the figure, in the ROADM device 10, the routing-protocol processing unit 13d checks if an optical signal is reachable with other ROADM device when starting up the ROADM device 10 or when a state of the low-speed link of the device itself (step S101). A checking method for the step S101 will not be mentioned particularly. For instance, it can be checked by making an inquiry to a network managing apparatus or by storing information on devices to which the optical signal is reachable in advance by an input from a network administrator.

Upon confirming that the optical signal is reachable (Yes at step S102), the routing-protocol processing unit 13d searches a low-speed link of other ROADM device capable of branching an optical signal transmitted from a low-speed link of the local device for every low-speed link, and generates a virtual link with the searched low-speed link (step S103).

After generating the virtual link, the routing-protocol processing unit 13d notifies link information indicating the generated virtual link to other devices (step S104).

Figure 9:
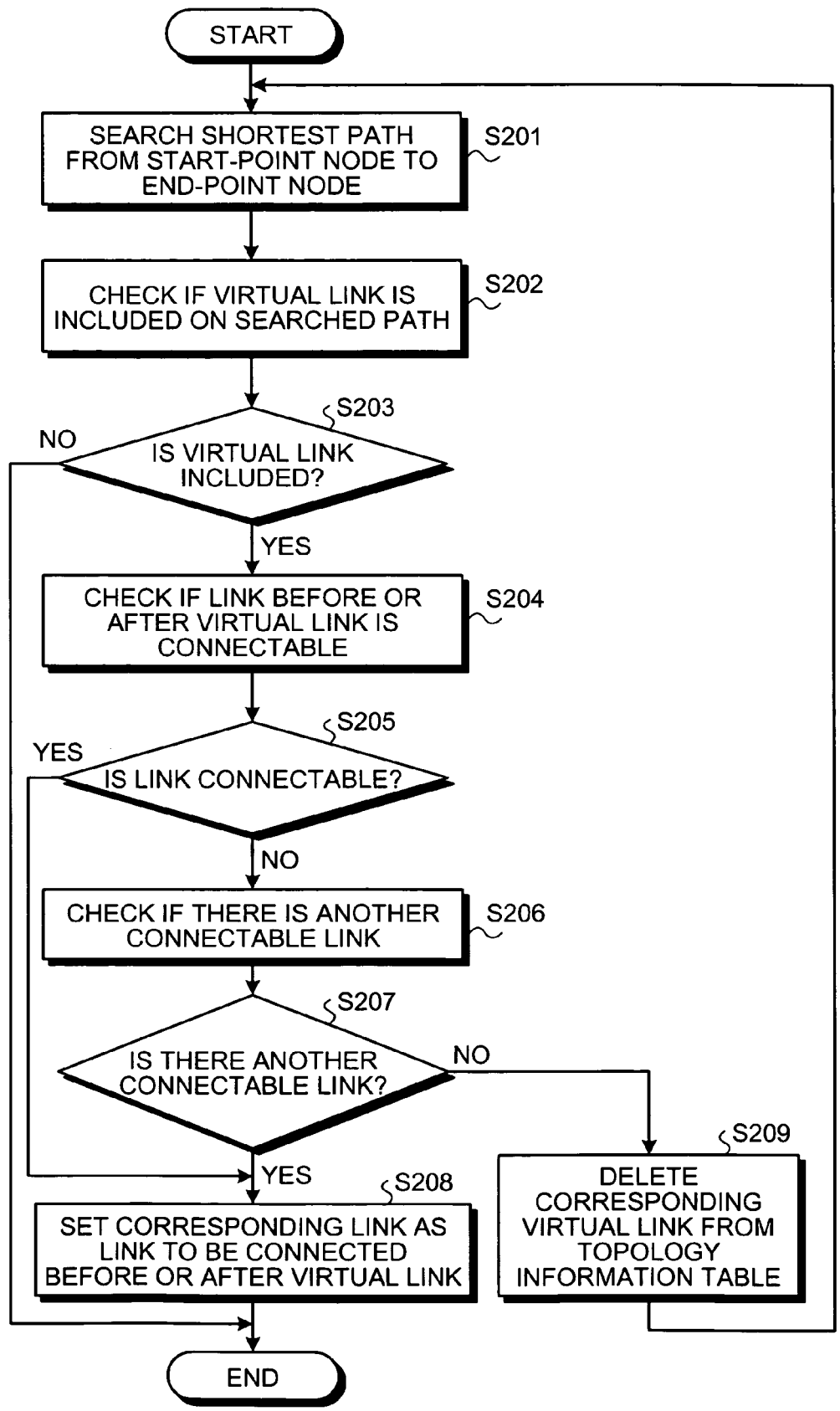
FIG. 9 is a flowchart of a path calculating process performed by the node apparatus shown in FIG. 7.

FIG. 9 is a flowchart of the path calculating process performed by the node apparatus 20 according to the embodiment.

As shown in the figure, in the node apparatus 20, upon receiving a request for establishing a path from a terminal user via a terminal apparatus connected to the node apparatus 20, the path-calculation processing unit 23d searches a shortest path from a start-point node to an end-point node specified by the terminal user (step S201). The path-calculation processing unit 23d selects a link that forms the path from the start-point node to the end-point node by referring the link information stored in the topology information table 22a.

Although the path-calculation processing unit 23d selects a link so that the path becomes the shortest and the path is formed with the smallest number of nodes, at this moment, the path-calculation processing unit 23d performs an accommodation availability determination based on a predetermined condition with respect to each link, and selects only the links determined to be available. For a method of determining the accommodation availability, a common determination method is employed. For instance, the path-calculation processing unit 23d selects only the links that satisfy a predetermined condition for setting values requested when establishing the path, such as a bit rate (a bandwidth) and various attributes (switching performance, encoding type, protection attribute, etc.).

Subsequently, the path-calculation processing unit 23d checks if a virtual link is included in the searched path (selected links) (step S202), and when the virtual link is not included (No at step S203), terminates the path calculating process. With this process, the shortest path searched at the step S201 becomes a result of the path calculation as it is.

On the other hand, when the virtual link is included in the searched shortest path (Yes at step S203), the path-calculation processing unit 23d refers to the link information stored in the topology information table 22a, and determines a link selected as a previous hop of the virtual link and a link selected as a next hop of the virtual link are connectable links for the virtual link, based on connectable-link pair information on the virtual link (step S204).

The path-calculation processing unit 23d refers to the link information on the virtual link stored in the topology information table 22a, and checks if a pair of the previous link of the virtual link and the next link of the virtual link is included in the connectable-link pair. When the pair of the links is included in the connectable-link pair, the path-calculation processing unit 23d determines that the pair of the links is connectable before and after the virtual link. On the other hand, when the pair of the links is not included in the connectable-link pair, the path-calculation processing unit 23d determines that the pair of the links is not connectable before and after the virtual link.

When it is determined that the previous link and the next link are connectable to the virtual link, i.e., the pair of the links matches with any one of the pairs in the connectable-link pair information on the virtual link (Yes at step S205), the path-calculation processing unit 23d selects the links as links to be connected before and after the virtual link (step S208), and outputs a path formed with the selected links as a result of the path calculation.

On the other hand, if there is no connectable links (No at step S205), the path-calculation processing unit 23d refers to the link information on the virtual link stored in the topology information table 22a checks if there is other connectable link with respect to the same remote device for each of the hops before and after the virtual link (step S206). In other words, the path-calculation processing unit 23d determines whether it is possible to establish a path from the start-point node to the end-point node by changing a link between node apparatuses on the searched shortest path without changing the node apparatuses on the shortest path.

The path-calculation processing unit 23d refers to the link information on the virtual link stored in the topology information table 22a, determines whether a pair of links regarding the same remote device is included in the connectable-link pair for each of the hops before and after the virtual link.

When there is other connectable link, i.e., there is a link having the same remote device in any one of the pairs included in the connectable-link pair information on the virtual link (Yes at step S207), the path-calculation processing unit 23d takes the link as the link to be connected before and after the virtual link (step S208).

In the link information on the virtual link stored in the topology information table 22a, which is referred in the above process, the link that is determined to be unavailable in the accommodation availability determination at the step S201 may be included. Therefore, when determining whether there is a link having the same remote device, the path-calculation processing unit 23d performs anew the accommodation availability determination, and takes only the links that are determined to be available as target links. In other words, even when there is a link having the same remote device in any one of the pairs included in the connectable-link pair information on the virtual link, if all of the links are unavailable, the path-calculation processing unit 23d determines that there is no other connectable links.

On the other hand, when there is no other connectable links, the path-calculation processing unit 23d deletes the virtual link from the topology information table 22a (step S209), and returns to the step S201 to start over the search of the shortest path.

Figure 10:
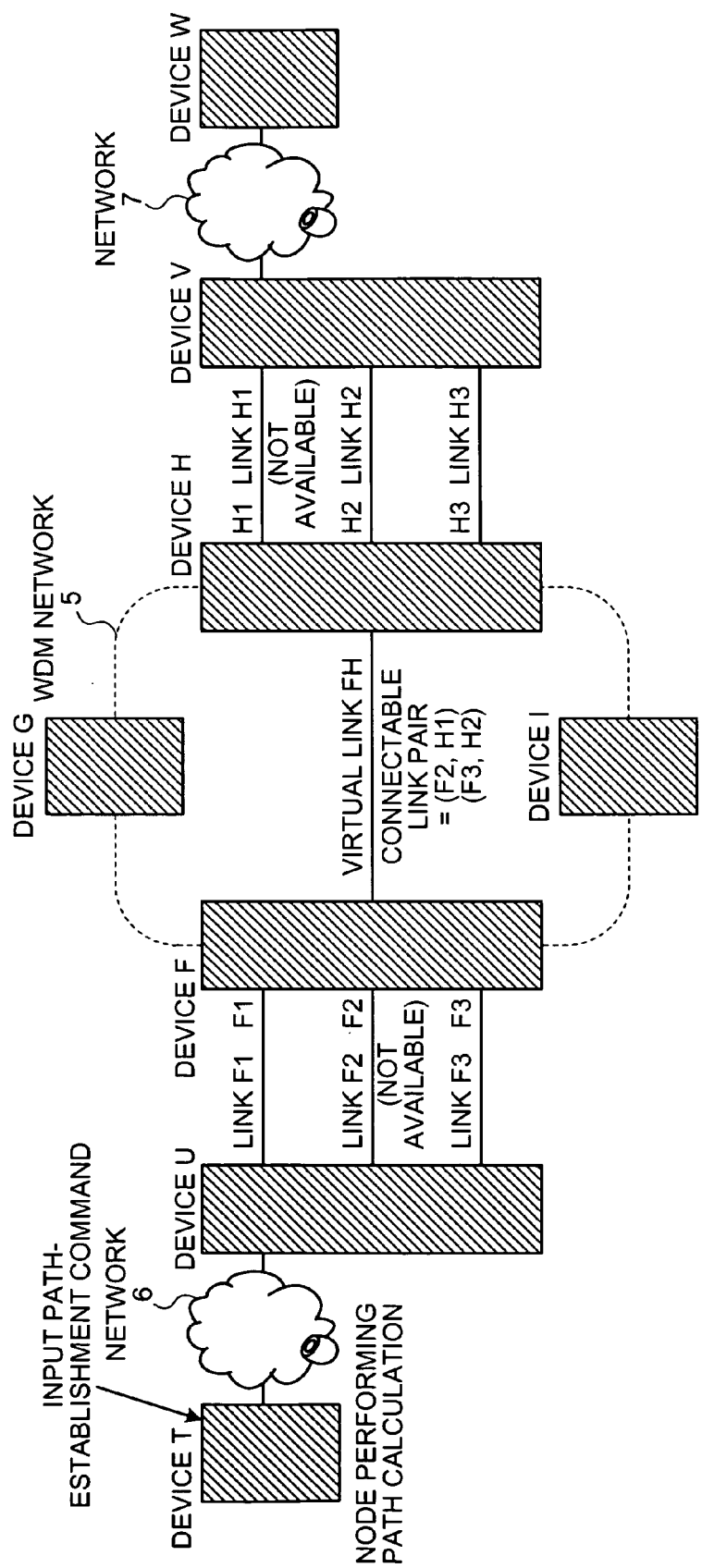
FIGS. 10 and 11 are schematic diagrams for explaining an example of the path calculating process.
Figure 11:
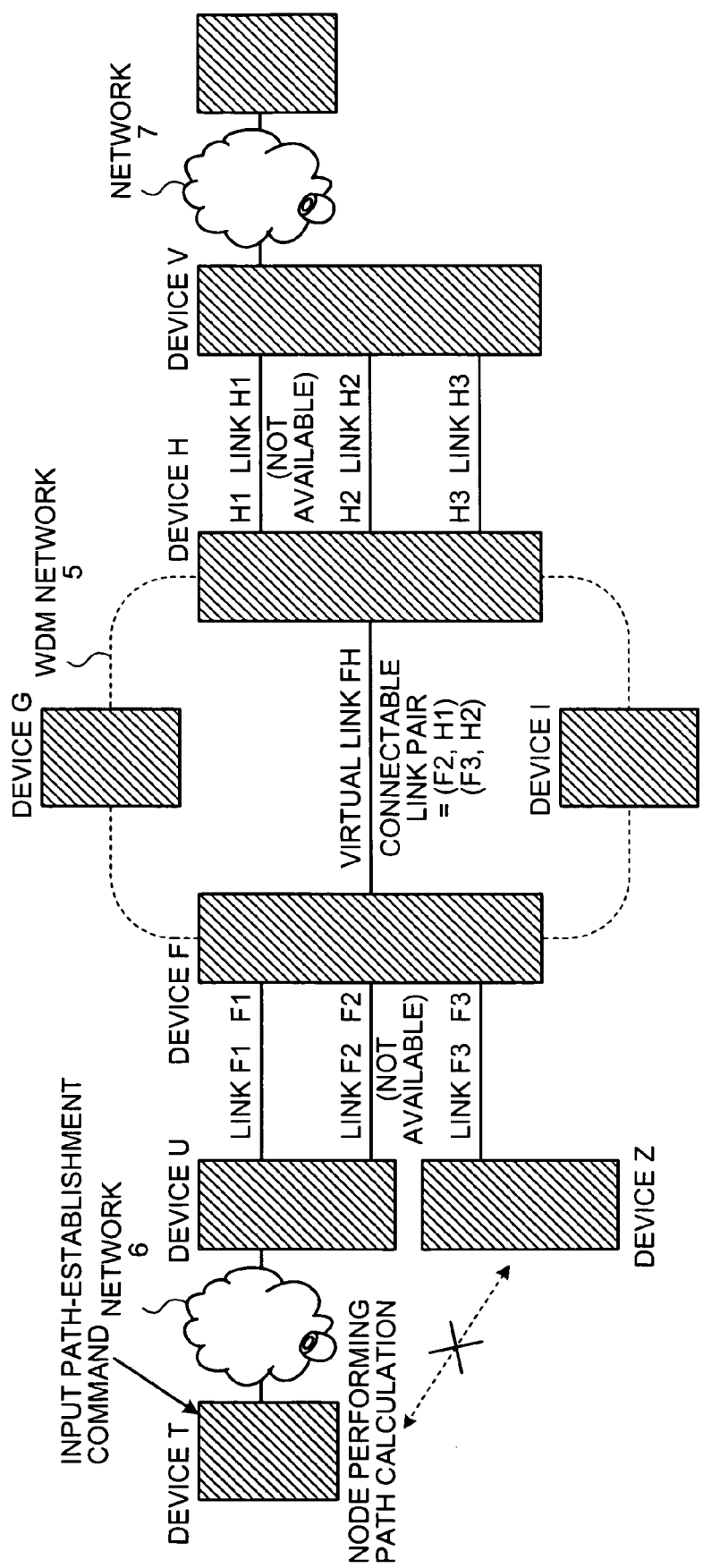
Figure 12:
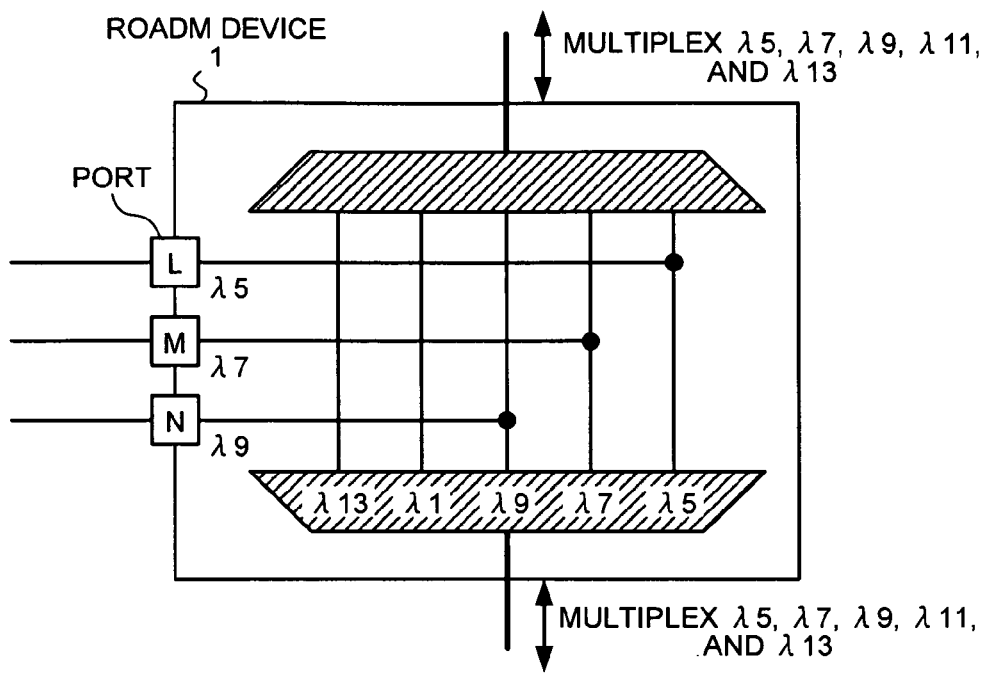
FIG. 12 is a schematic diagram for explaining a configuration of a conventional ROADM device.
Figure 13:
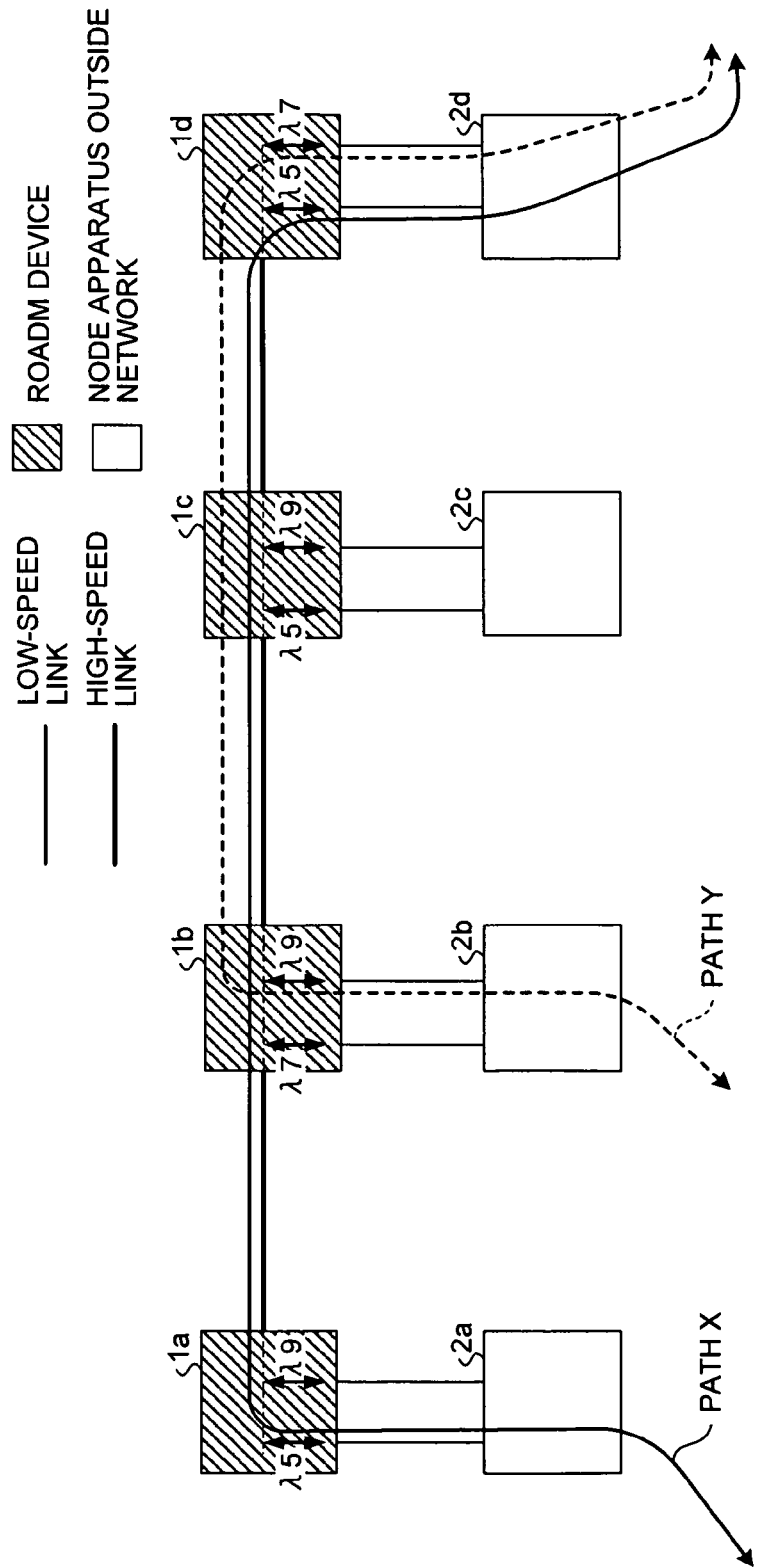
FIG. 13 is a schematic diagram for explaining a problem with the conventional network.

FIGS. 10 and 11 are schematic diagrams for explaining an example of the path calculating process. Each of devices F to I indicates a ROADM device, and each of devices T to W indicates a node apparatus.

The device F to I are connected via a WDM network 5, to build a ring network. The device U is connected to the device F via links F1, F2, and F3, and the device V is connected to the device H via links H1, H2, and H3. In addition, the device T is connected to the device U via a network 6, and the device W is connected to the device V via a network 7.

Furthermore, a virtual link FH is set between the device F and the device H. In the link information on the virtual link FH, a pair of a link F2 and a link H1 and a pair of a link F3 and a link H2 are included as the connectable-link pair.

A case in which a path calculation is performed for a path with the device T as the start-point node and the device W as the end-point node is considered in the device T. When a path-establishment command is input from a user, the path-calculation processing unit 23d of the device T searches the shortest path between the device T and the device W, in response to the request. For instance, it is assumed that the path-calculation processing unit 23d searched a path passing the link F1, the virtual link FH, and the link H1.

After searching the shortest path, the path-calculation processing unit 23d checks if a virtual link is included in the searched path, and because the virtual link FH is included in the searched path, refers to the link information stored in the topology information table 22a, and determines whether the link F1 that is selected as the previous hop of the virtual link FH and the link H1 that is selected as the next hop of the virtual link FH are connectable links for the virtual link FH by referring to the connectable-link pair of the virtual link FH.

Because the pair of the link F1 and the link H1 is not included in the connectable-link pair of the virtual link FH, the path-calculation processing unit 23d determines that these links are not connectable to the virtual link FH.

The path-calculation processing unit 23d checks if there is other connectable-link pair of a link between the device U and the device F and a link between the device H and the device V, by referring to the link information on the virtual link FH stored in the topology information table 22a.

In this case, the path-calculation processing unit 23d simply checks if there is a connectable-link pair of a link between the device U and the device F and a link between the device H and the device V. Therefore, even when the pair of the link F2 and the link H1 and the pair of the link F3 and the link H2 are included in the link information on the virtual link FH as the connectable-link pair, if a device Z that is a node apparatus different from the device U is connected to the link F3, as shown in FIG. 11, and if there is no link that connects the device Z and the device T, because a route of the path to be established (the path from the device T to the device W) is not possibly set through the link F3, the path-calculation processing unit 23d excludes the pair of the link F3 and the link H2 from the pairs to be checked.

Referring back to FIG. 10, because the pair of the link F2 and the link H1 and the pair of the link F3 and the link H2 are included in the connectable-link pair of the link information on the virtual link FH, the path-calculation processing unit 23d determines that the link F2 and the link H1 or the link F3 and the link H2 are connectable.

For instance, it is assumed that the pair of the link F2 and the link H1 is unavailable because it does not satisfy a necessary condition as a route of the requested path (for example, when a path of 2.4 G is requested, but the link information is notified with a remaining bandwidth of the link F2 or the link H1 zero). In this case, the path-calculation processing unit 23d takes the pair of the link F3 and the link H2 as the links to be connected before and after the virtual link, and outputs a path passing the link F3, the virtual link FH, and the link H2, as a result of the path calculation.

When both the pair of the link F2 and the link H1 and the pair of the link F3 and the link H2 are unavailable (these links are not selected in the search of the shortest path because they do not satisfy the necessary condition for the route of the path), the path-calculation processing unit 23d deletes the link information on the virtual link FH, and starts over the search of the shortest path As describe above, according to the embodiment, the ROADM device 10 generates link information that includes information on a virtual link in which a first link through which a signal is transmitted from the node apparatus 20 and a second link of a ROADM device that is capable of branching the signal when the signal transmitted using the first link is transmitted via a WDM network are virtually connected, and transmits the generated link information. Therefore, the node apparatus 20 can calculate a path for transmitting the signal based on the link information, and even when there is a restriction of branchable links in the ROADM device forming the WDM network, can automatically set a path of the signal that is transmitted through the WDM network.

Furthermore, according to the embodiment, the ROADM device 10 generates the link information including information on an actual link with a ROADM device connected with the device itself via an actual fiber. With this scheme, the node apparatus 20 can replace the virtual link with the actual link when performing a path calculation, and therefore, even a ROADM device without having a function of replacing the virtual link can set a path of the signal.

Moreover, according to the embodiment, the ROADM device 10 stores connectable-link information in which a first link through which a signal is transmitted from the node apparatus 20 is associated with a second link of a ROADM device that is capable of branching the signal when the signal transmitted using the first link is transmitted via a WDM network in the connectable-link information table 12a, and generates link information including information on a virtual link based on the stored connectable-link information. Therefore, it is possible to change the virtual link to be generated by changing appropriately the connectable-link information.

Furthermore, according to the embodiment, the ROADM device 10 regenerates the link information including the information on the virtual link every time the connectable-link information stored in the connectable-link information table 12a is changed, and retransmits the link information including the information on the virtual link every time the virtual link is regenerated. Therefore, it is possible to automatically change the virtual link to be generated by changing appropriately the connectable-link information.

Moreover, according to the embodiment, upon receiving specified-path information including information on a virtual link calculated based on transmitted link information from the node apparatus 20, the ROADM device 10 converts the information on the virtual link included in the specified-path information into information on an actual link with a signal branching apparatus connected to the device itself via an actual fiber, and transfers the specified-path information including the information on the converted actual link. Therefore, even when a node apparatus without having a function of converting the virtual link is employed, it is possible to set a path of the signal.

Furthermore, according to the embodiment, the node apparatus 20 receives link information transmitted from the ROADM device 10 that generates the link information that includes information on a virtual link in which a first link through which a signal is transmitted from the node apparatus 20 and a second link of a ROADM device that is capable of branching the signal when the signal transmitted using the first link is transmitted via a WDM network are virtually connected, calculates a transmission path based on the received link information, and transmits the calculated transmission path as the path information. Therefore, even when there is a restriction of branchable link in the ROADM device 10 constituting the WDM network, it is possible to automatically set a path of the signal transmitted via the WDM network, by performing a path setting based on the path information.

Moreover, according to the embodiment, when information on a virtual link is included in the calculated transmission path, the node apparatus 20 converts the information on the virtual link into information on an actual link with a ROADM device connected to the ROADM device 10 via an actual fiber. Therefore, the path information transmitted to the ROADM device 10 is already converted into the actual link, and even when a ROADM device without having a function of converting the virtual link is employed, it is possible to set a path of the signal.

Various processes explained in the embodiment can be realized by executing a program, which is provided in advance, with a processing unit installed in a computer, such as a central processing unit (CPU), a micro control unit (MCU), and a micro processing unit (MPU).

In the ROADM device 10, various programs for realizing various processes are stored in a storage device (not shown in FIG. 6) such as a read only memory (ROM), a hard disk, and a flash memory, and the various processes that realize functions of the control-communication processing unit 13*a*, the operation-command processing unit 13*b*, the device managing unit 13*c*, the routing-protocol processing unit 13*d*, and the signaling-protocol processing unit 13*e* are started by reading out the various programs stored in the ROM by the control unit 13 and executing the read programs.

In the node apparatus 20, various programs for realizing various processes are stored in a storage device (not shown in FIG. 7) such as a ROM and a hard disk, and the various processes that realize functions of the control-communication processing unit 23*a*, the routing-protocol processing unit 23*b*, the signaling-protocol processing unit 23*c*, and the path-calculation processing unit 23*d* are started by reading out the various programs stored in the ROM by the control unit 23 and executing the read programs.

Although the ROADM device is explained according to the embodiment, the present invention is not limited to the ROADM device, but can be applied in the same way to other device as long as the other device is a signal branching apparatus having a restriction on a connected link.

Although a network multiplexed in the WDM system is explained according to the embodiment, the present invention is not limited to this scheme, but can be applied in the same way to a network of the SONET/SDH system having a restriction on a time slot.

Although a ring-type network is explained according to the embodiment, the present invention is not limited to this scheme, but can be applied in the same way to a network of a mesh type or a bus type (linear type).

From among the processes explained according to the embodiment, all or a part of the processes explained as automatically performed can be manually performed, and all or a part of the processes explained as manually performed can be automatically performed.

In addition, it is possible to arbitrarily change a processing procedure, a control procedure, a specific name, and information including various data and parameters, if not otherwise specified.

The constituent elements of the respective devices are functionally conceptual, and need not necessarily be configured physically as shown in the drawings. That is, the arrangement of the respective devices is not limited to that shown in the drawings, and can be functionally or physically separated or integrated partly or wholly according to the load or usage.

The same function of the respective devices can be entirely or partially realized by a CPU or a computer program executed by the CPU. The respective devices can also be implemented in wired-logic hardware.

As describe above, according to an aspect of the present invention, a signal relay apparatus generates link information including a virtual link in which a first link that is used by a node apparatus for transmitting a signal and a second link of a signal branching apparatus that is capable of branching a signal transmitted via the first link when the signal is transmitted via the first network are virtually connected each other, and transmits the generated link information. Therefore, the node apparatus can calculate a transmission path of the signal based on the link information, and even when there is a restriction on a branchable link in the signal branching apparatus constituting the network, it is possible to automatically set a path of the signal transmitted through the network.

Furthermore, according to another aspect of the present invention, the signal relay apparatus generates the link information including an actual link between the signal relay apparatus and a signal branching apparatus connected to the signal relay apparatus via an actual line. Therefore, the node apparatus can convert the virtual link into the actual link when performing the path calculation, and even with a signal relay apparatus and a signal branching apparatus without having a function of converting the virtual link, it is possible to set a path of the signal.

Moreover, according to still another aspect of the present invention, the signal relay apparatus stores connectable-link information in which a first link that is used by a node apparatus for transmitting a signal is associated with a second link of a signal branching apparatus that is capable of branching a signal transmitted via the first link when the signal is transmitted via the first network, and generates the link information including the virtual link based on the stored connectable-link information. Therefore, it is possible to change the virtual link to be generated by changing appropriately the connectable-link information.

Furthermore, according to still another aspect of the present invention, the signal relay apparatus regenerates the link information including the virtual link every time the stored connectable-link information is changed, and retransmits the link information including the virtual link every time the virtual link is regenerated. Therefore, it is possible to automatically change the virtual link to be generated by changing appropriately the connectable-link information.

Moreover, according to still another aspect of the present invention, upon receiving specified-path information including information on a virtual link calculated based on transmitted link information from a node apparatus, the signal relay apparatus converts the information on the virtual link included in the specified-path information into information on an actual link with a signal branching apparatus connected to the device itself via an actual fiber, and transfers the specified-path information including the information on the converted actual link. Therefore, even when a node apparatus without having a function of converting the virtual link is employed, it is possible to set a path of the signal.

Furthermore, according to still another aspect of the present invention, the node apparatus receives link information transmitted from a signal relay apparatus that generates the link information that includes a virtual link in which a first link through which a signal is transmitted from the node apparatus and a second link of a signal branching apparatus that is capable of branching the signal when the signal transmitted using the first link is transmitted via the first network are virtually connected, calculates a transmission path based on the received link information, and transmits the calculated transmission path as the path information. Therefore, even when there is a restriction of branchable link in the signal branching apparatus constituting the network, it is possible to automatically set a path of the signal transmitted via the network, by performing a path setting based on the path information.

Moreover, according to still another aspect of the present invention, when information on a virtual link is included in the calculated transmission path, the node apparatus converts the information on the virtual link into information on an actual link with a signal branching apparatus connected to the signal relay apparatus via an actual line. Therefore, the path information transmitted to the signal relay apparatus is already converted into the actual link, and even when a signal relay apparatus and a signal branching apparatus without having a function of converting the virtual link is employed, it is possible to set a path of the signal.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A signal relay apparatus that is connected to a first network with a signal branching apparatus that branches a signal transmitted via the first network to a second network, the signal relay apparatus adding a signal, which is transmitted from a node apparatus via a third network, to the first network, the signal relay apparatus comprising:
    a memory; and
    a processor coupled to the memory, wherein the processor executes a process comprising:
        generating link information including an identifier for identifying a local apparatus, an identifier for identifying a link of the local apparatus, an identifier for identifying a remote apparatus, an identifier for identifying a link of the remote apparatus that is capable of branching the link of the local apparatus, and a pair of connectable links, the link information including connectable-link information that indicates the pair of connectable links, the connectable-link information associating a first link with a second link, the first link connecting to the node apparatus for transmitting a signal via the second network connected to the local apparatus, the second link connecting to other device that is capable of branching a signal transmitted via the first link of the local apparatus via the third network when the signal is transmitted via the first network are virtually connected each other;
        storing the connectable-link information including the pair of connectable links in which the first link that is used by the node apparatus for transmitting a signal and the second link of the signal branching apparatus that is capable of branching a signal transmitted via the first link with the same wavelength of the signal transmitted via the first link; and
        transmitting the connectable-link information stored at the storing.

2. The signal relay apparatus according to claim 1, wherein the connectable-link information including an actual link between the signal relay apparatus and a signal branching apparatus connected to the signal relay apparatus via an actual line.

3. The signal relay apparatus according to claim 1, the processor further executes the process comprising storing therein the link information in which the first link is associated with the second link, wherein
    the connectable-link information including the virtual link based on stored connectable-link information.

4. The signal relay apparatus according to claim 3, wherein
    the virtual-link generating unit regenerates the link information including the connectable-link information including the virtual link every time the connectable-link link information stored at the storing is changed, and
    the link-information transmitting unit retransmits the link information including the connectable-link information including the virtual link every time the link information is regenerated.

5. The signal relay apparatus according to claim 1, wherein
    the virtual-link generating unit regenerates the link information including the connectable-link information including the virtual link every time a state of a link of the signal branching apparatus is changed, and
    the link-information transmitting unit retransmits the link information including the connectable-link information including the virtual link every time the link information is regenerated.

6. The signal relay apparatus according to claim 1, wherein the connectable-link information including the virtual link for each pair of the signal relay apparatus and the signal branching apparatus.

7. The signal relay apparatus according to claim 1, the processor further executes the process, upon receiving path information including information on the virtual link, based on transmitted link information, the process comprising:
    converting the information on the virtual link included in the path information into information on an actual link with a signal branching apparatus connected to the signal relay apparatus via an actual line, and
    transferring path information including information on converted actual link.

8. The signal relay apparatus according to claim 7, wherein the converting converts the information on the virtual link into the information on the actual link by using information on an actual link that minimizes a hop count of the actual link.

9. The signal relay apparatus according to claim 7, wherein the converting converts the information on the virtual link into the information on the actual link by using information on an actual link that minimizes a cost of the actual link.

10. The signal relay apparatus according to claim 7, wherein the converting converts the information on the virtual link into the information on the actual link based on an opening state of the actual link.

11. A node apparatus that calculates a transmission path of a signal routed through a first network that includes a signal branching apparatus and a signal relay apparatus, the node apparatus comprising:
   a memory; and
   a processor coupled to the memory, wherein the processor executes a process comprising:
      receiving link information including an identifier for identifying a local apparatus, an identifier for identifying a link of the local apparatus, an identifier for identifying a remote apparatus, an identifier for identifying a link of the remote apparatus that is capable of branching the link of the local apparatus, and a pair of connectable links, the link information including connectable-link information that indicates the pair of connectable links, the link information transmitted from a signal relay apparatus that generates the connectable-link information associating a first link with a second link, the first link connecting to the node apparatus, the second link connecting to other device that is capable of branching a signal transmitted via the first link of the local apparatus via the third network when the signal is transmitted via the first network are virtually connected each other;
      storing the connectable-link information including the pair of connectable links in which the first link with which a signal is transmitted from the node apparatus and the second link of the signal branching apparatus that is capable of branching a signal transmitted via the first link with the same wavelength of the signal transmitted via the first link;
      calculating the transmission path based on the received link information; and
      transmitting the transmission path calculated at the calculating as path information.

12. The node apparatus according to claim 11, the processor further executes the process when information on a virtual link is included in the calculated transmission path, the process comprising converting the information on the virtual link into information on an actual link with the signal branching apparatus connected to the signal relay apparatus via an actual line.

13. The node apparatus according to claim 12, wherein the converting converts the information on the virtual link into the information on the actual link by using information on an actual link that minimizes a hop count of the actual link.

14. The node apparatus according to claim 12, wherein the converting converts the information on the virtual link into the information on the actual link by using information on an actual link that minimizes a cost of the actual link.

15. The node apparatus according to claim 12, wherein the converting converts the information on the virtual link into the information on the actual link based on an opening state of the actual link.

16. A network system configured with a signal branching apparatus that branches a signal transmitted via a first network to a second network, a signal relay apparatus that adds a signal transmitted via a third network to the first network, and a node apparatus that calculates a transmission path of a signal routed through the first network, wherein
   the signal relay apparatus is connected to the first network with the signal branching apparatus,
   the signal relay apparatus includes
      a first memory; and
      a first processor coupled to the memory, wherein the first processor executes a process comprising:
         generating link information including an identifier for identifying a local apparatus, an identifier for identifying a link of the local apparatus, an identifier for identifying a remote apparatus, an identifier for identifying a link of the remote apparatus that is capable of branching the link of the local apparatus, and a pair of connectable links, the link information including connectable-link information that indicates the pair of connectable links, the connectable-link information associating a first link with a second link, the first link connecting to the node apparatus for transmitting a signal via the second network connected to the local apparatus, the second link connecting to other device that is capable of branching a signal transmitted via the first link of the local apparatus via the third network when the signal is transmitted via the first network are virtually connected each other;
         storing the connectable-link information including the pair of connectable links in which the first link that is used by the node apparatus for transmitting a signal and the second link of the signal branching apparatus that is capable of branching a signal transmitted via the first link with the same wavelength of the signal transmitted via the first link; and
         transmitting the connectable-link information stored at the storing, and the node apparatus includes
      a second memory; and
      a second processor coupled to the memory, wherein the second processor executes a process comprising:
         receiving the link information transmitted from the signal relay apparatus;
         calculating the transmission path based on the received link information; and
         transmitting the transmission path calculated at the calculating as path information.

17. A virtual-link generating method of generating a virtual link by a signal relay apparatus that is connected to a first network with a signal branching apparatus that branches a signal transmitted via the first network to a second network, the signal relay apparatus adding a signal, which is transmitted from a node apparatus via a third network, to the first network, the virtual-link generating method comprising:
   generating link information, using a processor, including an identifier for identifying a local apparatus, an identifier for identifying a link of the local apparatus, an identifier for identifying a remote apparatus, an identifier for identifying a link of the remote apparatus that is capable of branching the link of the local apparatus, and a pair of connectable links, the link information including connectable-link information that indicates the pair of connectable links, the connectable-link information associating a first link with a second link, the first link connecting to the node apparatus for transmitting a signal via the second network connected to the local apparatus, the second link connecting to other device that is capable of branching a signal transmitted via the first link of the local apparatus via the third network when the signal is transmitted via the first network are virtually connected each other;
   storing the connectable-link information including the pair of connectable links in which the first link that is used by the node apparatus for transmitting a signal and the second link of the signal branching apparatus that is capable of branching a signal transmitted via the first link with the same wavelength of the signal transmitted via the first link; and transmitting the connectable-link information generated at the generating.

18. A path calculating method of calculating a transmission path of a signal routed through a first network that is built by a signal branching apparatus and a signal relay apparatus, the path calculating method comprising:

receiving link information including an identifier for identifying a local apparatus, an identifier for identifying a link of the local apparatus, an identifier for identifying a remote apparatus, an identifier for identifying a link of the remote apparatus that is capable of branching the link of the local apparatus, and a pair of connectable links, the link information including connectable-link information that indicates the pair of connectable links, the link information transmitted from a signal relay apparatus that generates the connectable-link information associating a first link with a second link, the first link connecting to the node apparatus, the second link connecting to other device that is capable of branching a signal transmitted via the first link of the local apparatus via the third network when the signal is transmitted via the first network are virtually connected each other;

storing the connectable-link information including the pair of connectable links in which the first link with which a signal is transmitted from the node apparatus and the second link of the signal branching apparatus that is capable of branching a signal transmitted via the first link with the same wavelength of the signal transmitted via the first link;

calculating the transmission path, using a processor, based on the link information received at the receiving; and transmitting the transmission path calculated at the calculating as path information.

19. A computer-readable non-transitory medium that stores therein a computer program that causes a computer to generate a virtual link by that causes a computer to function as signal relay apparatus that is connected to a first network with a signal branching apparatus that branches a signal transmitted via the first network to a second network, the signal relay apparatus adding a signal, which is transmitted from a node apparatus via a third network, to the first network, the computer program causing the computer to execute:

generating link information including an identifier for identifying a local apparatus, an identifier for identifying a link of the local apparatus, an identifier for identifying a remote apparatus, an identifier for identifying a link of the remote apparatus that is capable of branching the link of the local apparatus, and a pair of connectable links, the link information including connectable-link information that indicates the pair of connectable links, the connectable-link information associating a first link with a second link, the first link connecting to the node apparatus for transmitting a signal via the second network connected to the local apparatus, the second link connecting to other device that is capable of branching a signal transmitted via the first link of the local apparatus via the third network when the signal is transmitted via the first network are virtually connected each other;

storing the connectable-link information including the pair of connectable links in which the first link that is used by the node apparatus for transmitting a signal and the second link of the signal branching apparatus that is capable of branching a signal transmitted via the first link with the same wavelength of the signal transmitted via the first link; and transmitting the link information generated at the generating.

20. A computer-readable non-transitory medium that stores therein a computer program that causes a computer to calculate a transmission path of a signal routed through a first network that is built by a signal branching apparatus and a signal relay apparatus, the computer program causing the computer to execute:

receiving link information including an identifier for identifying a local apparatus, an identifier for identifying a link of the local apparatus, an identifier for identifying a remote apparatus, an identifier for identifying a link of the remote apparatus that is capable of branching the link of the local apparatus, and a pair of connectable links, the link information including connectable-link information that indicates the pair of connectable links, the link information transmitted from a signal relay apparatus that generates the connectable-link information associating a first link with a second link, the first link connecting to the node apparatus, the second link connecting to other device that is capable of branching a signal transmitted via the first link of the local apparatus via the third network when the signal is transmitted via the first network are virtually connected each other;

storing the connectable-link information including the pair of connectable links in which the first link with which a signal is transmitted from the node apparatus and the second link of the signal branching apparatus that is capable of branching a signal transmitted via the first link with the same wavelength of the signal transmitted via the first link;

calculating the transmission path based on the link information received at the receiving; and transmitting the transmission path calculated at the calculating as path information.

* * * * *